US009244373B2

(12) United States Patent
Kitao et al.

(10) Patent No.: US 9,244,373 B2
(45) Date of Patent: Jan. 26, 2016

(54) TONER AND METHOD OF PRODUCING TONER

(71) Applicant: CANON KABUSHIKI KAISHA, Tokyo (JP)

(72) Inventors: Akiko Kitao, Kawasaki (JP); Ryuji Higashi, Kawasaki (JP); Taichi Shintou, Saitama (JP); Takeshi Miyazaki, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 13/971,050

(22) Filed: Aug. 20, 2013

(65) Prior Publication Data

US 2014/0057202 A1 Feb. 27, 2014

(30) Foreign Application Priority Data

Aug. 22, 2012 (JP) ................................ 2012-183477

(51) Int. Cl.

*G03G 9/09* (2006.01)
*G03G 9/08* (2006.01)
*C09B 47/073* (2006.01)

(52) U.S. Cl.

CPC ............ *G03G 9/0924* (2013.01); *C09B 47/073* (2013.01); *G03G 9/0802* (2013.01); *G03G 9/0806* (2013.01); *G03G 9/0918* (2013.01)

(58) Field of Classification Search

CPC ... G03G 9/0918; G03G 9/0924; G03G 9/122; G03G 9/0806; C09B 47/04
USPC ................ 430/108.21, 108, 24, 114, 137.17; 540/128, 140
See application file for complete search history.

(56) References Cited

U.S. PATENT DOCUMENTS 3,094,536 A 6/1963 Kenney et al.
5,972,551 A 10/1999 Miyauchi et al.
6,813,449 B2 11/2004 Miyazaki et al.
7,141,342 B2 11/2006 Toyoda et al.
7,264,910 B2 9/2007 Toyoda et al.
7,288,357 B2 10/2007 Toyoda et al.
7,833,685 B2 11/2010 Tanaka et al.
7,833,687 B2 11/2010 Kato et al.
8,211,606 B2 7/2012 Murai et al.
2008/0171278 A1* 7/2008 Yasukawa et al. ....... 430/108.21
2008/0199793 A1 8/2008 Lim
2009/0075192 A1 3/2009 Hayashi et al.
2009/0123861 A1 5/2009 Kouyama et al.
2012/0040285 A1 2/2012 Shibata et al.
2012/0231388 A1 9/2012 Kawamura et al.
2013/0108952 A1 5/2013 Nakano et al.
2013/0202998 A1 8/2013 Higashi et al.
2014/0057203 A1 2/2014 Higashi et al.
2014/0080049 A1 3/2014 Ujifusa et al.
2014/0113229 A1 4/2014 Tani et al.

FOREIGN PATENT DOCUMENTS

CN 1186092 A 7/1998
CN 101246318 A 8/2008
CN 102262362 A 11/2011

(Continued)

OTHER PUBLICATIONS

European Search Report dated Dec. 2, 2013 in European Application No. 13180988.1.
Sinha, et al., "Thin Polyurethane Films of Polyhydroxysilicon Phthalocyanine and Bis-phthalocyanine Derivatives", Polymer Journal, 1995, vol. 27, No. 11, pp. 1079-1084.
Brewis, et al., "Silicon Phthalocyanines with Axial Dendritic Substituents", Angew. Chem. Int. Ed., 1998, vol. 37, No. 8, pp. 1092-1094.
Brach, et al., "Improved Synthesis of Metal-free Phthalocyanines", Journal of Heterocycle Chemistry, 1970, pp. 1403-1405.

(Continued)

*Primary Examiner* — Janis L Dote
(74) *Attorney, Agent, or Firm* — Fitzpatrick, Cella, Harper and Scinto

(57) ABSTRACT

The present invention provides a toner that exhibits an excellent chromogenicity and provides a method of producing a toner that has an excellent particle size distribution and an excellent chromogenicity, in which a toner containing a binder resin and a colorant that contains a coloring compound with general formula (1), and a method of producing this toner.

general formula (1)

$R_3$, $R_2$, $R_4$, $R_1$, $R_5$, $R_6$, $H_2C$, O, A, N, M, O, $CH_2$, $R_{12}$, $R_{11}$, $R_7$, $R_{10}$, $R_8$, $R_9$

16 Claims, No Drawings

(56) References Cited

FOREIGN PATENT DOCUMENTS

| | | | |
|---|---|---|---|
| EP | 0 366 440 | A2 | 5/1990 |
| JP | 2009-122496 | A | 6/2009 |

OTHER PUBLICATIONS

Chinese Office Action dated Oct. 21, 2015 in Chinese Application No. 201310368581.X.

* cited by examiner

TONER AND METHOD OF PRODUCING TONER

TECHNICAL FIELD

The present invention relates to a toner for use in recording methods such as electrophotographic methods, electrostatic recording methods, magnetic recording methods, and toner jet methods. The present invention also relates to a method of producing this toner.

BACKGROUND ART

The requirements placed on image-forming apparatuses for higher color image quality have been increasing in recent years. In an image-forming apparatus such as a digital full-color copier or printer, the original image is first subjected to color separation by individual blue, green, and red filters. An electrostatic latent image corresponding to the original image is formed on the photosensitive member and is developed using individual colored developers, i.e., yellow, magenta, cyan, and black. As a consequence, the tinting strength exhibited by the colorant in each colored developer exercises a strong influence on image quality.

Specifically, in order to raise image quality there is desire in the printing industry to approximate the AdobeRGB that is used in the RGB workflow and to reproduce Japan Color.

However, at the present time additional improvements to the colorants are still necessary in order to reproduce the image quality of Japan Color or AdobeRGB.

Particularly with regard to the cyan colorant within this context, it has been said that the color space cannot be satisfactorily broadened with the copper phthalocyanine compounds in widespread use at the present time and that novel colorants must be developed (Japanese Patent Application Laid-open No. 2009-122496).

In order to solve this problem, a cyan colorant was developed that contains a phthalocyanine compound having a substituent on the central metal atom and an electrostatically developable toner having a high lightness and an excellent color tone was obtained when this cyan colorant was used (Japanese Patent Application Laid-open No. 2009-122496).

SUMMARY OF INVENTION

However, further improvement was still required with regard to toner chromogenicity.

Moreover, there were effects on the particle size distribution of the toner depending on the type of colorant and the method of producing the toner.

An object of the present invention is therefore to solve the problems indicated above.

Thus, an object of the present invention is to provide a toner that exhibits an excellent chromogenicity.

A further object of the present invention is to provide a method of producing a toner that exhibits an excellent particle size distribution and an excellent chromogenicity.

The problems indicated above are solved by the invention described herebelow.

Thus, a first aspect of the present invention relates to a toner containing a binder resin and a colorant, wherein the colorant contains a coloring compound having the structure given by general formula (1) below.

A second aspect of the present invention relates to a method of producing a toner, including the step of dispersing in an aqueous medium a polymerizable monomer composition containing a polymerizable monomer and a colorant to produce particles of the polymerizable monomer composition and thereafter polymerizing the polymerizable monomer to produce toner particles, wherein the colorant contains a coloring compound that has the structure given by the general formula (1) below.

general formula (1)

[C1]

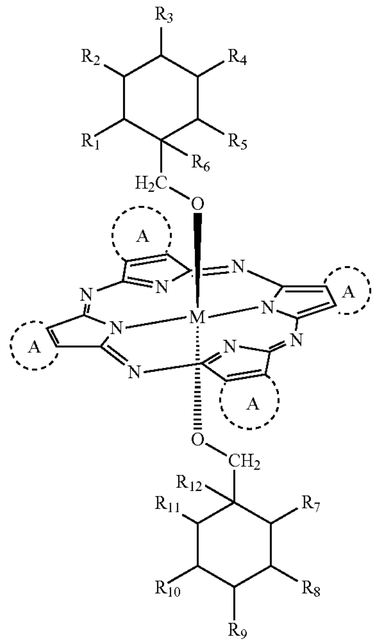

In general formula (1), $R_1$ to $R_6$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_1$ to $R_6$ to each other;

$R_7$ to $R_{12}$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_7$ to $R_{12}$ to each other;

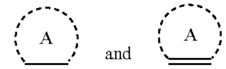

each independently represent either one of a substituted or unsubstituted aryl ring and a heterocycle that contains 1 or 2 nitrogen atoms; and M represents at least one metal atom selected from the group consisting of Si, Ge, and Sn.

The present invention can provide a toner that exhibits a high chromogenicity. The present invention can also provide a method of producing a toner that exhibits an excellent particle size distribution and an excellent chromogenicity.

Further features of the present invention will become apparent from the following description of exemplary embodiments.

DESCRIPTION OF EMBODIMENTS

The present invention is described below in additional detail using embodiments.

The present inventors carried out intensive investigations in order to solve the problems described above. They discovered as a result that, for a toner containing a binder resin and a colorant, a toner that exhibits an excellent chromogenicity can be provided by having the colorant contain a coloring compound having the structure given by the following general formula (1).

general formula (1)

[C2]

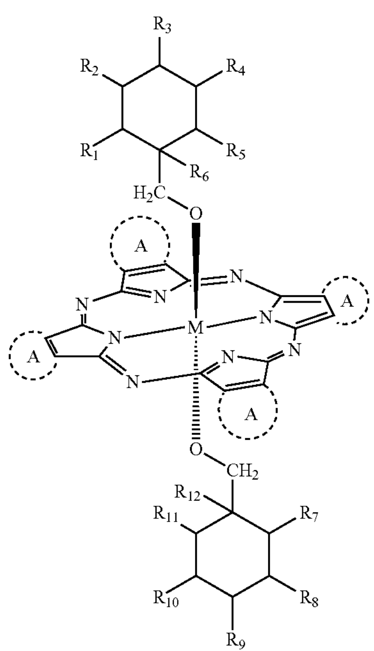

In general formula (1), $R_1$ to $R_6$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_1$ to $R_6$ to each other;

$R_7$ to $R_{12}$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_7$ to $R_{12}$ to each other;

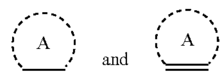

each independently represent either one of a substituted or unsubstituted aryl ring and a heterocycle that contains 1 or 2 nitrogen atoms; and M represents at least one metal atom selected from the group consisting of Si, Ge, and Sn.

<The Coloring Compound>

The coloring compound having the structure with general formula (1) will be described first.

The alkyl group encompassed by $R_1$ to $R_{12}$ in general formula (1) is not particularly limited and can be exemplified by $C_1$ to $C_{20}$ alkyl groups that may be saturated or unsaturated, straight chain, branched, or cyclic, and primary, secondary, or tertiary, e.g., the methyl group, ethyl group, n-propyl group, iso-propyl group, n-butyl group, sec-butyl group, tert-butyl group, octyl group, dodecyl group, nonadecyl group, cyclobutyl group, cyclopentyl group, cyclohexyl group, methylcyclohexyl group, 2-ethylpropyl group, 2-ethylhexyl group, and cyclohexenylethyl group.

The aryl group encompassed by $R_1$ to $R_{12}$ in general formula (1) is not particularly limited and can be exemplified by the phenyl group. This aryl group may be substituted and the substituted aryl group can be exemplified by the tolyl group and the o-xylyl group.

The aralkyl group encompassed by $R_1$ to $R_{12}$ in general formula (1) is not particularly limited and can be exemplified by the benzyl group.

The amino group encompassed by $R_1$ to $R_{12}$ in general formula (1) is not particularly limited and can be exemplified by the unsubstituted amino group, by monosubstituted amino groups such as the N-butylamino group and N-benzylamino group, and by disubstituted amino groups such as the N,N-diethylamino group.

Viewed from the standpoint of the chromogenicity, the coloring compound having the structure shown by general formula (1) preferably satisfies the following condition i) or ii):

(i) $R_1$ to $R_6$ are atomic groups as required to form a saturated cyclic hydrocarbon ring by the bonding of any two or more of $R_1$ to $R_6$ to each other;

(ii) $R_7$ to $R_{12}$ are atomic groups as required to form a saturated cyclic hydrocarbon ring by the bonding of any two or more of $R_7$ to $R_{12}$ to each other.

In such a structure the saturated cyclic hydrocarbon ring having $R_1$ to $R_6$ or the saturated cyclic hydrocarbon ring having $R_7$ to $R_{12}$ takes the form of a polycyclic saturated cyclic hydrocarbon ring.

The following rings (1) to (13), (15) and (16) are specific examples of the saturated cyclic hydrocarbon ring having $R_1$ to $R_6$ in general formula (1) or the saturated cyclic hydrocarbon ring having $R_7$ to $R_{12}$ in general formula (1). In the following examples, symbol * shows a binding site for methylene.

[C3]

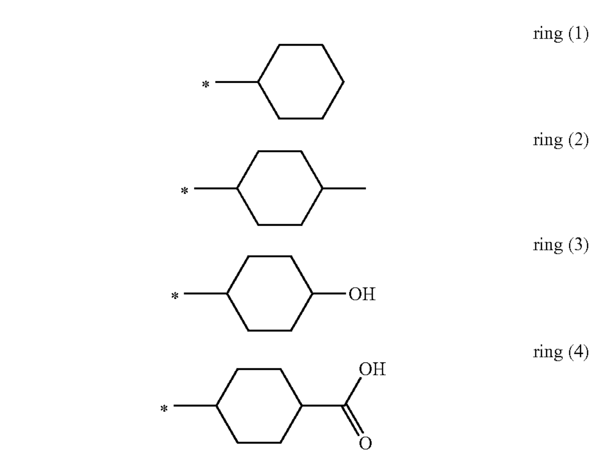

-continued ring (5)

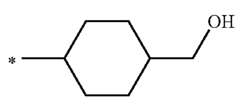

ring (6)

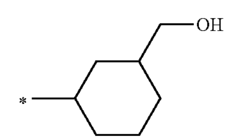

ring (7)

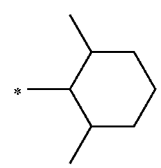

ring (8)

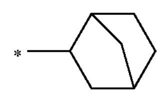

ring (9)

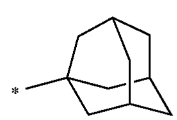

ring (10)

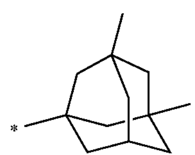

ring (11)

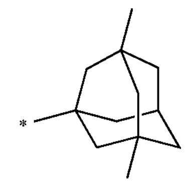

ring (12)

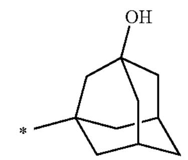

ring (13)

ring (15)

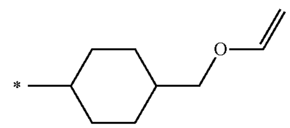

-continued ring (16)

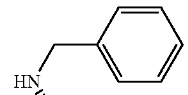

From the standpoint of the chromogenicity, ring (1), ring (8), and ring (9) are preferred among rings (1) to (13), (15) and (16), while ring (8) and ring (9) are more preferred and ring (9) [the adamantane ring] is even more preferred.

The aryl ring represented by

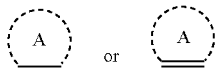

in general formula (1) is not particularly limited and can be exemplified by the benzene ring and naphthyl ring. These rings may also be substituted insofar as this does not affect the chromogenicity. The specific substituent can be exemplified by alkyl groups such as the methyl group, propyl group, and tert-butyl group; alkoxy groups such as the methoxy group, ethoxy group, propoxyl group, butoxy group, and hexyloxy group; the nitro group; and halogen atoms such as the chlorine atom. Viewed from a synthesis standpoint, these substituents are not necessarily regularly directed and various isomers may be obtained. These isomers do not exercise a significant effect on the chromogenicity.

The heterocycle having 1 or 2 nitrogen atoms represented by

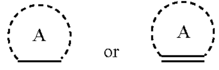

in general formula (1) is not particularly limited and can be exemplified by the pyrrolidine ring, piperidine ring, azepane ring, and azocane ring.

Preferred among the preceding from the standpoint of the chromogenicity are the substituted or unsubstituted benzene ring, pyridine ring, and pyrazine ring, while the substituted or unsubstituted benzene ring is particularly preferred and a benzene ring bearing the tert-butyl group is even more preferred.

The M in general formula (1) represents at least one metal atom selected from the group consisting of Si, Ge, and Sn. Among these, Si is preferred for the metal atom from the standpoint of the chromogenicity.

The coloring compounds according to the present invention having the structure given by general formula (1) can be synthesized with reference to the known methods described in, for example, *Polymer Journal*, Vol. 27, No. 11, pp. 1079-1084 (1995) and *Angew. Chem. Int. Ed.*, Vol. 37, No. 8, pp. 1092-1094 (1998).

An embodiment of a method for producing the coloring compound having the structure given by general formula (1) is provided below, but this should not be taken to mean that the production method is limited to or by this.

[C4]

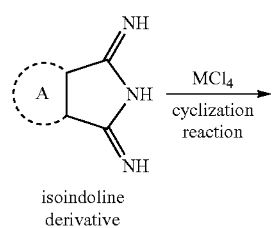

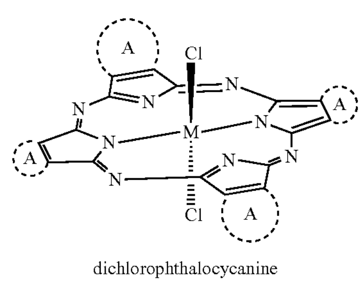

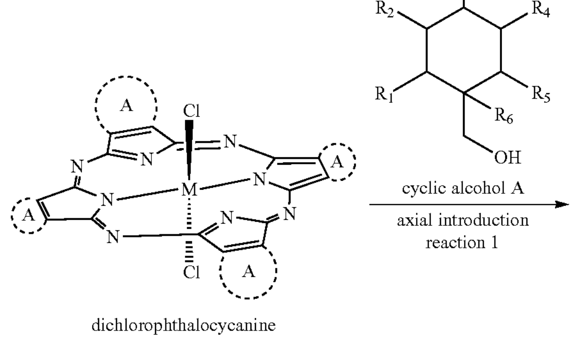

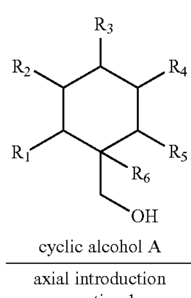

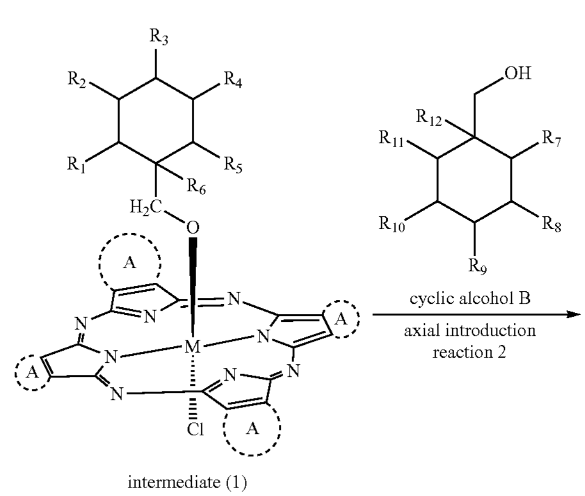

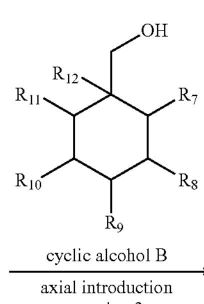

-continued

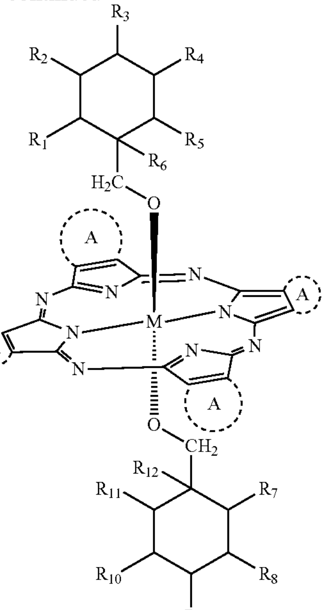

The cyclization reaction will be considered in detail first.

The isoindoline derivative can be readily synthesized from a 1,2-dicyanobenzene derivative by the known method described in *Journal of Heterocycle Chemistry*, pp. 1403-1405 (1970).

In addition, the dichlorophthalocyanine can be readily synthesized by reacting the isoindoline derivative and metal halide at at least 200° C. in a solvent such as quinoline or chloronaphthalene.

The axial introduction reactions 1 and 2 are considered in detail below.

The coloring compound having the structure given by general formula (1) can be obtained by an axial introduction reaction 1, in which the dichlorophthalocyanine is reacted with a cyclic alcohol A, and an axial introduction reaction 2, in which the intermediate (1) is reacted with a cyclic alcohol B.

The axial introduction reaction 1 can be run in the absence of a solvent, but is preferably run in the presence of a solvent. The solvent should not participate in the reaction but otherwise is not particularly limited and can be exemplified by toluene, xylene, monochlorobenzene, dichlorobenzene, pyridine, and quinoline.

A mixture of two or more solvents may also be used, and the mixing ratio may be freely selected when a mixture is used. The amount of use (mass basis) of the reaction solvent is preferably from 0.1- to 1000-times that of the dichlorophthalocyanine and is more preferably from 1.0- to 150-times that of the dichlorophthalocyanine.

The reaction temperature in axial introduction reaction 1 is preferably in the range from −80° C. to 250° C. and is more preferably from −20° C. to 150° C. The reaction can ordinarily be completed within 10 hours.

In the case of axial introduction reaction 1, the reaction runs rapidly when an optional base is added.

The base used in the axial introduction reaction 1 can be specifically exemplified by metal alkoxides such as potassium tert-butoxide, sodium tert-butoxide, sodium methoxide, and sodium ethoxide; organic bases such as piperidine, pyridine, 2-methylpyridine, diethylamine, triethylamine, isopropylethylamine, potassium acetate, and 1,8-diazabicyclo [5.4.0]undec-7-ene (abbreviated as DBU below); organic bases such as n-butyllithium and tert-butylmagnesium chloride; and inorganic bases such as sodium borohydride, sodium metal, sodium hydride, and sodium carbonate. Preferred among the preceding are potassium tert-butoxide, sodium hydride, sodium methoxide, sodium ethoxide, and piperidine, while sodium hydride and piperidine are more preferred because they are inexpensive and easy to handle.

The amount of use of the base used in the axial introduction reaction 1 is preferably from 0.1 to 1.5 equivalents, more preferably from 0.2 to 1.3 equivalents, and even more preferably from 0.3 to 1.1 equivalents, in each case with reference to the cyclic alcohol A.

The axial introduction reaction 2 step is carried out after the completion of the reaction in the axial introduction reaction 1.

The reaction temperature in the axial introduction reaction 2 is preferably in the range from −80° C. to 250° C. and more preferably −20° C. to 150° C. The reaction can ordinarily be completed within 10 hours.

In the case of the axial introduction reaction 2, the reaction runs rapidly when an optional base is added.

The base used in the axial introduction reaction 2 is specifically exemplified by the bases provided as examples of the base that can be used in the axial introduction reaction 1.

The amount of use of the base used in the axial introduction reaction 2 is preferably from 0.1 to 10 equivalents, more preferably 0.5 to 5.0 equivalents, and even more preferably from 0.8 to 2.0 equivalents, in each case with reference to the cyclic alcohol B.

After the completion of the reaction, the obtained solid is filtered off; the residue is washed with a nonpolar solvent such as n-hexane, n-heptane, or toluene; and washing is then carried out with a polar solvent such as an alcohol and then with, for example, ion-exchanged water, to obtain the coloring compound with the structure shown in general formula (1).

In conformity with the toner production method or in order to adjust the color tone, a single coloring compound with the structure shown in general formula (1) may be used or a combination of two or more may be used.

The content in the toner of the coloring compound with the structure shown in general formula (1) is preferably from 1.0 to 100.0 mass parts per 100 mass parts of the binder resin. It is more preferably from 1.0 to 70.0 mass parts and even more preferably from 1.0 to 50.0 mass parts.

The coloring compound with general formula (1) may also be used in combination with a known pigment or dye.

Known pigments that may be used can be exemplified by the following, but there is no limitation to these pigments:

C. I. Pigment Blue 1, C. I. Pigment Blue 1:2, C. I. Pigment Blue 9, C. I. Pigment Blue 15:1, C. I. Pigment Blue 15:2, C. I. Pigment Blue 15:3, C. I. Pigment Blue 15:4, C. I. Pigment Blue 15:6, C. I. Pigment Blue 16, C. I. Pigment Blue 24, C. I. Pigment Blue 25, C. I. Pigment Blue 63, C. I. Pigment Blue 66, C. I. Pigment Blue 68, C. I. Pigment Blue 75, and C. I. Pigment Blue 79.

Coloring compounds (1) to (19), (21) to (24) and (26) to (41) are given below as preferred specific examples of the coloring compound having the structure given by general formula (1), but the present invention is not limited to or by the examples provided below.

[C5]

compound (1)

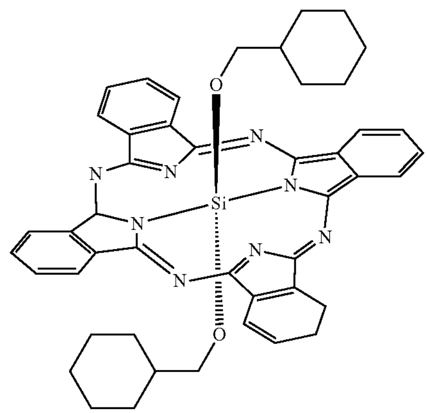

compound (2)

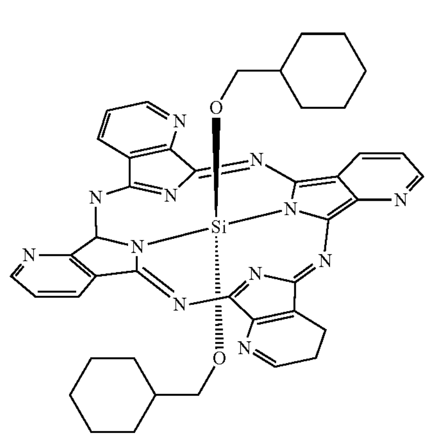

compound (3)

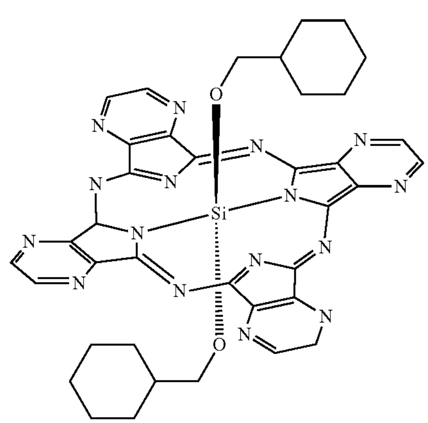

-continued
compound (4)
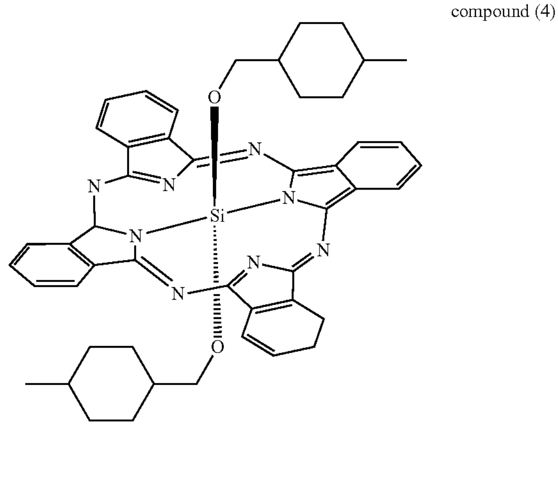
compound (5)
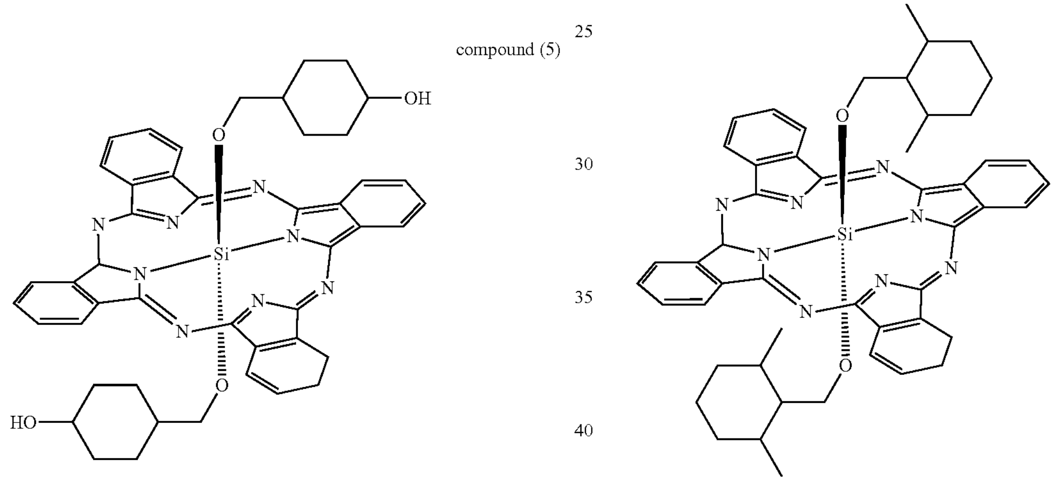
compound (6)
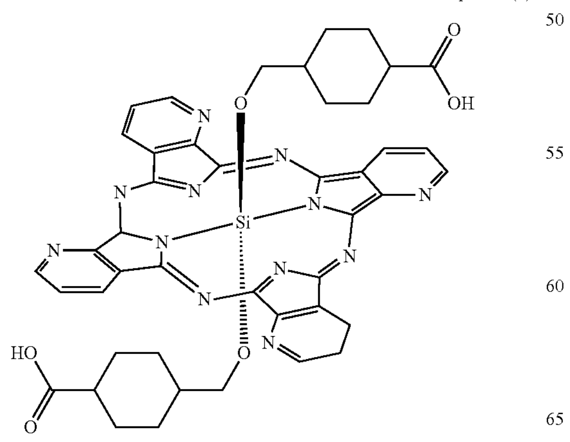
-continued
compound (7)
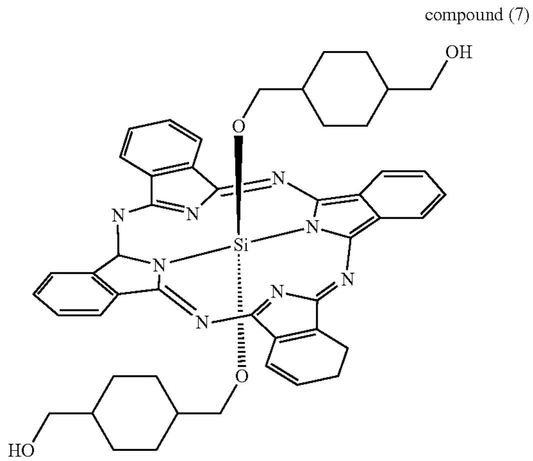
compound (8)
compound (9)
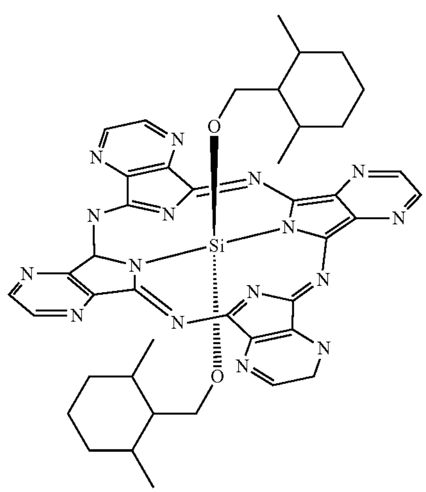

[C6]
compound (10)
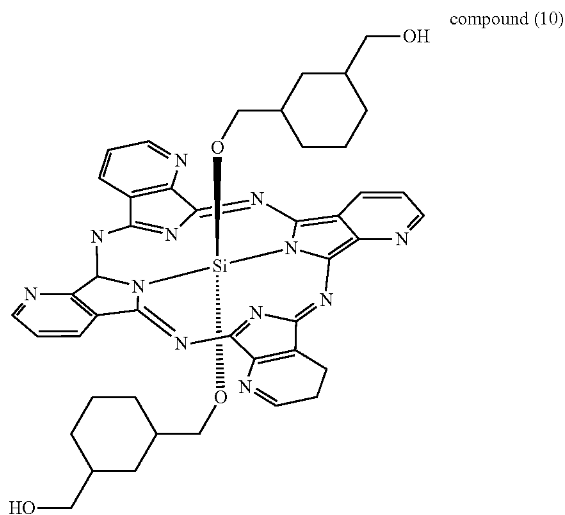
compound (11)
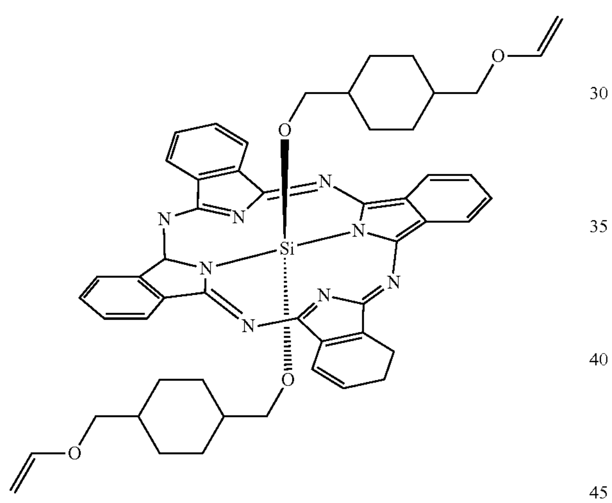
compound (12)
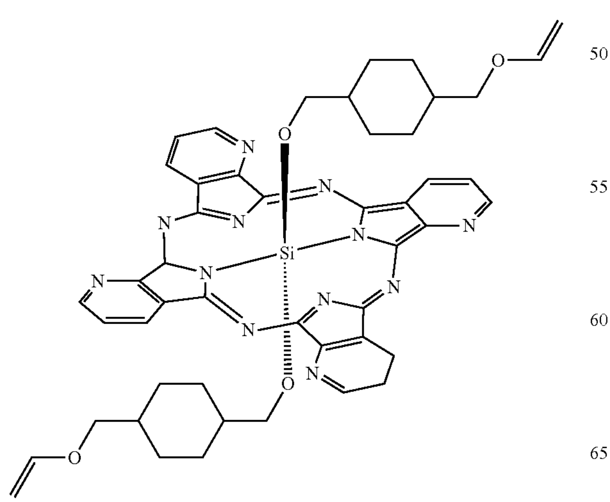
compound (13)
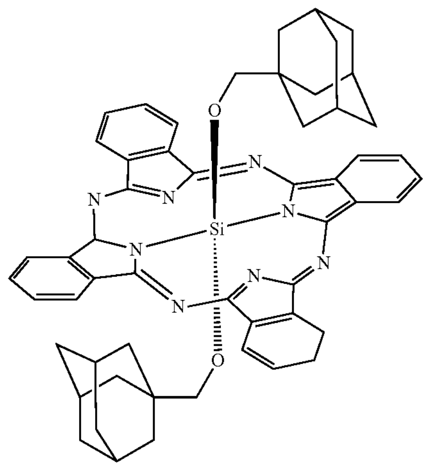
compound (14)
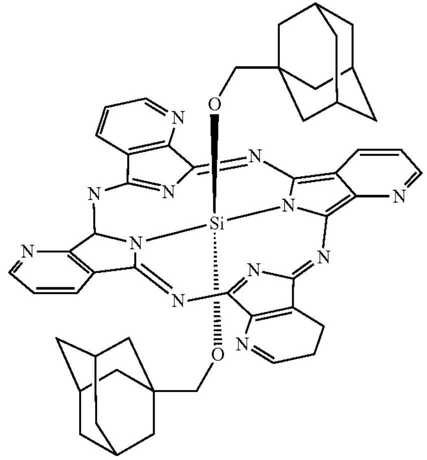
compound (15)
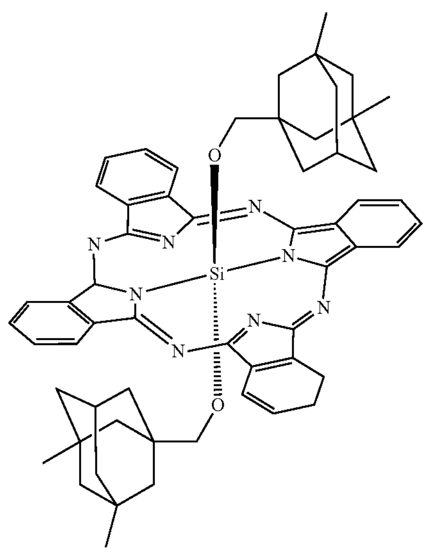

-continued
compound (16)
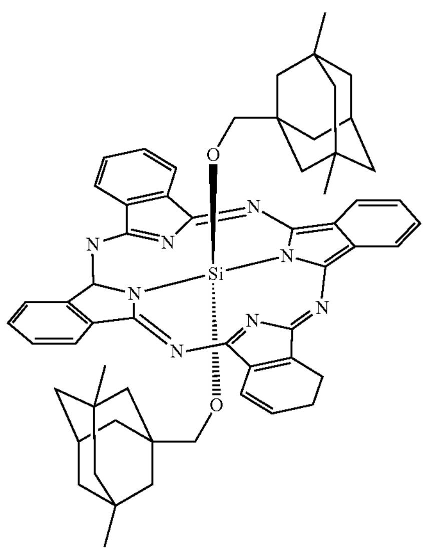
compound (17)
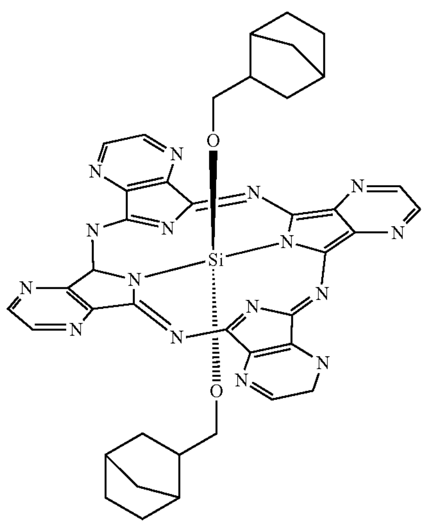
compound (18)
-continued
compound (19)
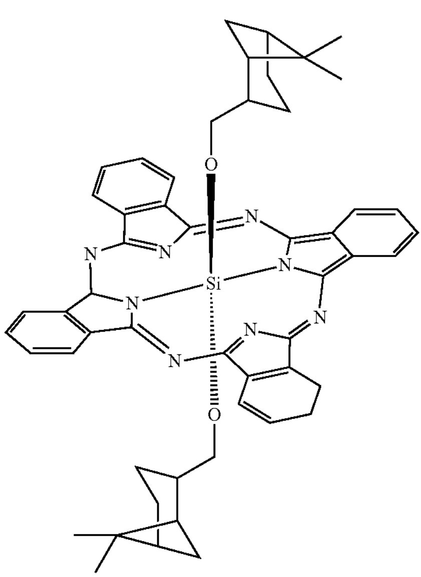
compound (21)
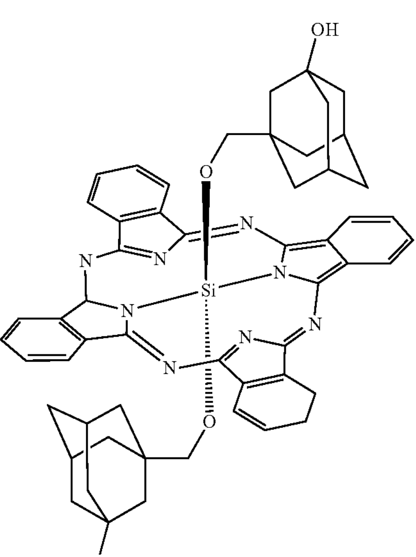
[C7]
compound (22)
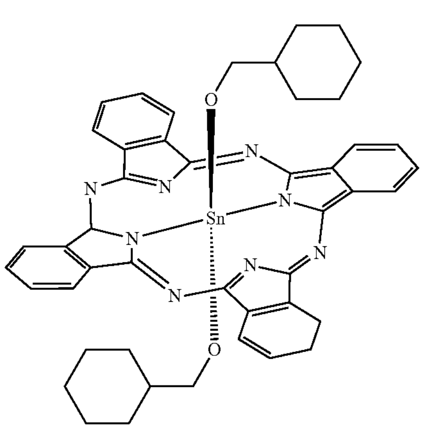

-continued
compound (23)
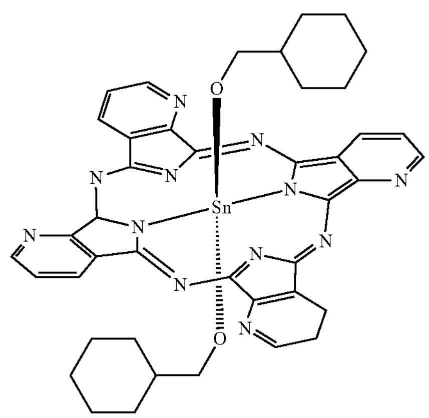
compound (24)
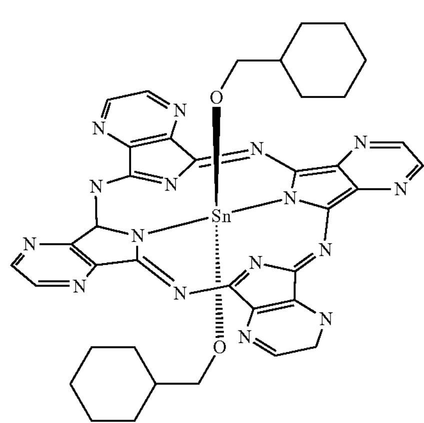
compound (26)
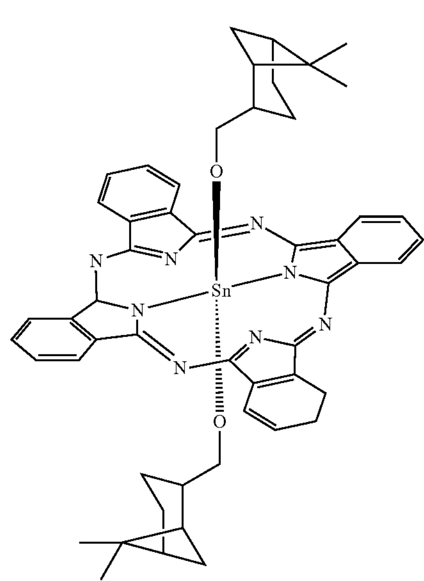
-continued
compound (27)
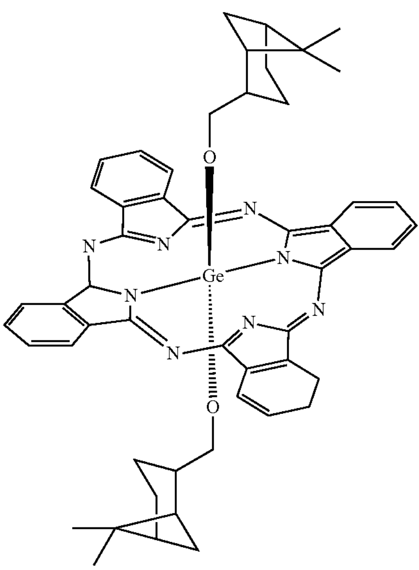
compound (28)
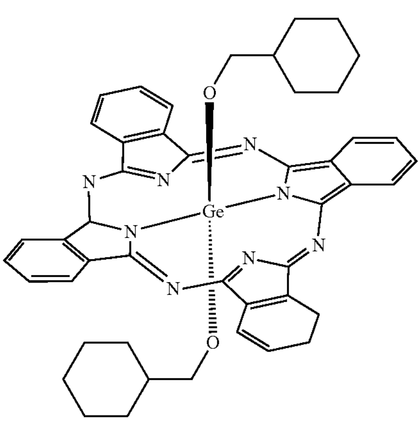
compound (29)
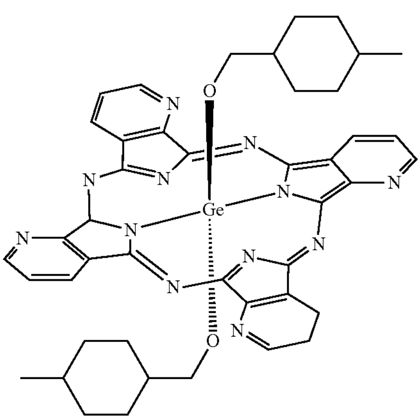

-continued
compound (30)
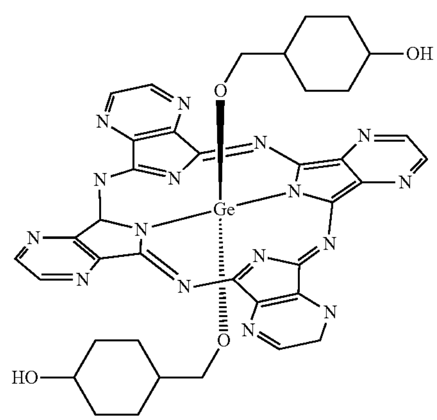
compound (31)
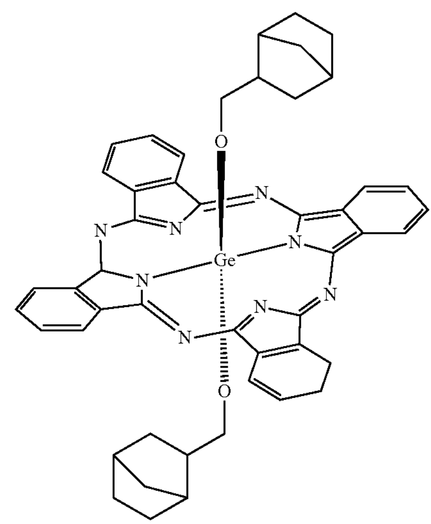
compound (32)
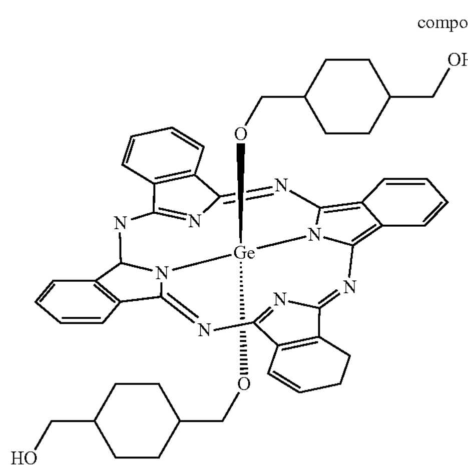
-continued
compound (33)
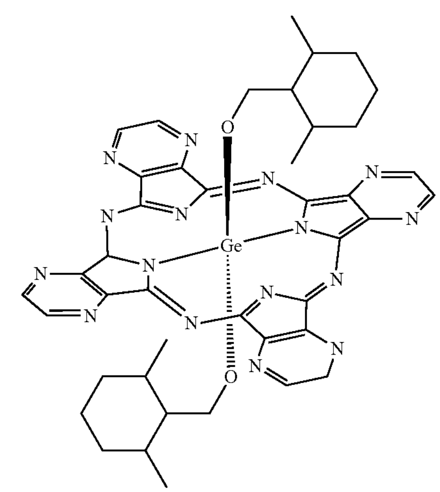
[C8]
compound (34)
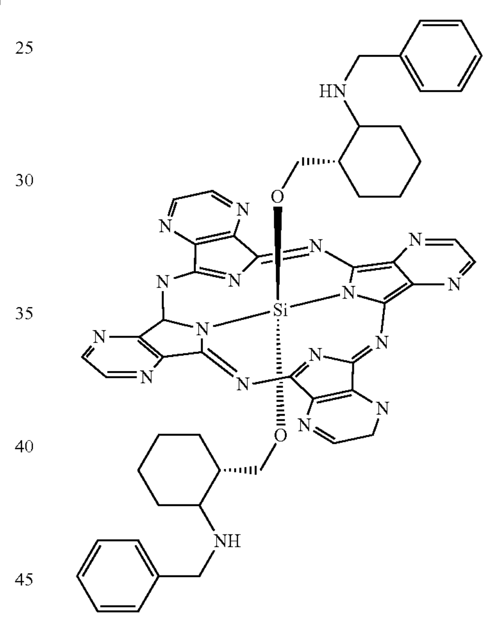
compound (35)
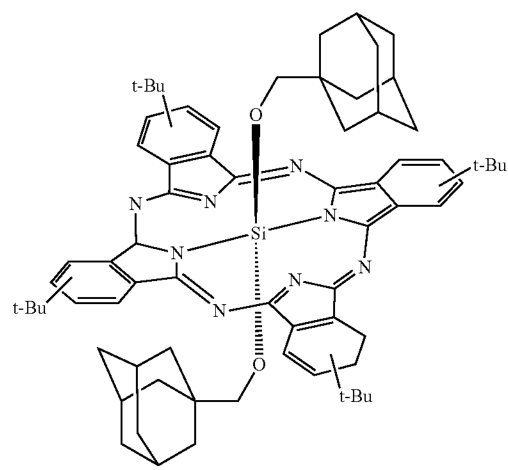

-continued compound (36)

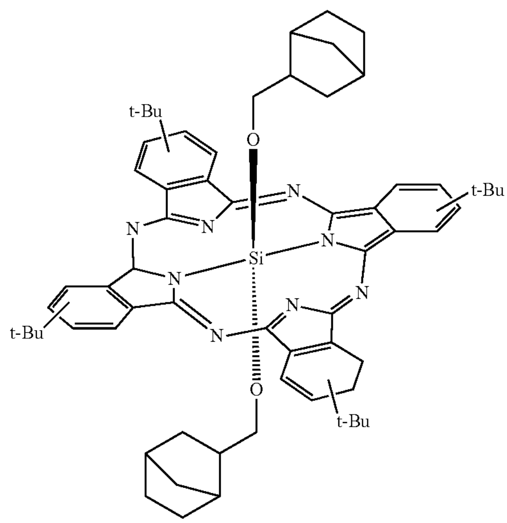

compound (37)

compound (38)

-continued compound (39)

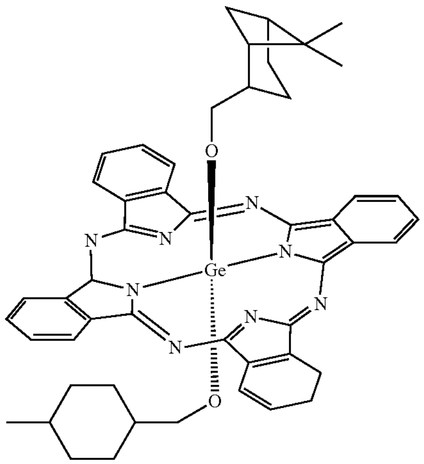

compound (40)

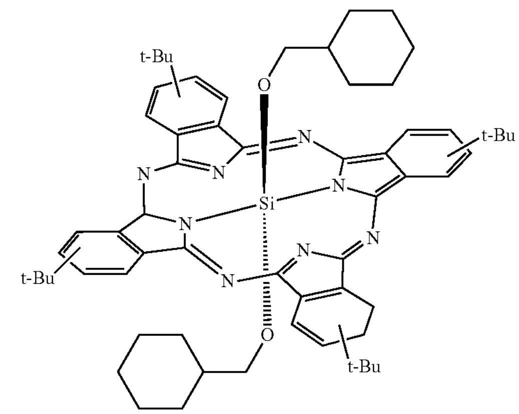

compound (41)

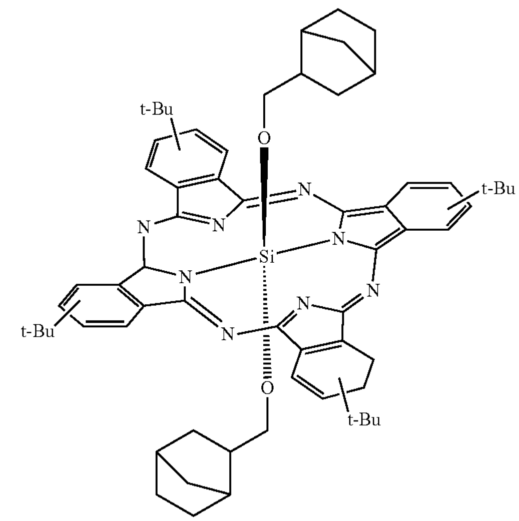

t-Bu in the preceding structures represents the tert-butyl group.

<The Toner>

The toner is described in the following.

(The Binder Resin)

There are no particular limitations on the binder resin used in the toner in the present invention, but, for example, thermoplastic resins are preferably used.

Specific examples are the homopolymers and copolymers (styrenic resins) of styrenes such as styrene, para-chlorostyrene, and α-methylstyrene; the homopolymers and copolymers (vinyl resins) of vinyl group-containing esters such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; the homopolymers and copolymers (vinyl resins) of vinyl nitriles such as acrylonitrile and methacrylonitrile; the homopolymers and copolymers (vinyl resins) of vinyl ethers such as vinyl ethyl ether and vinyl isobutyl ether; the homopolymers and copolymers (vinyl resins) of vinyl ketones such as vinyl methyl ketone, vinyl ethyl ketone, and vinyl isopropenyl ketone; the homopolymers and copolymers (olefin resins) of olefins such as ethylene, propylene, butadiene, and isoprene; non-vinylic condensation resins such as epoxy resins, polyester resins, polyurethane resins, polyamide resins, cellulose resins, and polyether resins; and graft polymers between these non-vinylic condensation resins and a vinylic monomer. A single one of these resins may be used or two or more may be used in combination. In the case of the polyester resins, the charging characteristics of the toner are prone to exhibit an increased environmental dependence when the number of molecular chain terminal groups is increased. As a consequence, the acid value is preferably not more than 90 mg KOH/g and more preferably is not more than 50 mg KOH/g. In addition, the hydroxyl value is preferably not more than 50 mg KOH/g and more preferably is not more than 30 mg KOH/g.

The glass-transition temperature of the polyester resin is preferably from 50° C. to 75° C. and more preferably is from 55° C. to 65° C. The number-average molecular weight (Mn) of the polyester resin is preferably from 1,500 to 50,000 and more preferably is from 2,000 to 20,000. The weight-average molecular weight (Mw) of the polyester resin is preferably from 6,000 to 100,000 and more preferably is from 10,000 to 90,000.

A crosslinking agent may also be used in binder resin synthesis in order to raise the mechanical strength of the toner and control the molecular weight of the binder resin in the toner.

There are no particular limitations on the crosslinking agent used in the toner of the present invention, and the crosslinking agent can be exemplified by the following:

for example, difunctional crosslinking agents such as divinylbenzene, bis(4-acryloxypolyethoxyphenyl)propane, 2,2-bis(4-methacryloxyphenyl)propane, diallyl phthalate, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, the diacrylates of polyethylene glycol #200, #400, and #600, dipropylene glycol diacrylate, polypropylene glycol diacrylate, polyester-type diacrylates, and the difunctional crosslinking agents provided by replacing the diacrylate in the preceding with dimethacrylate.

Nor are there particular limitations on the polyfunctional crosslinking agents, and they can be exemplified by pentaerythritol triacrylate, trimethylolethane triacrylate, trimethylolpropane triacrylate, tetramethylolmethane tetraacrylate, oligoester acrylate and its methacrylate, triallyl cyanurate, triallyl isocyanurate, and triallyl trimellitate.

The amount of use of these crosslinking agents, expressed with reference to 100 mass parts of the polymerizable monomer, infra, is preferably from 0.05 to 10 mass parts and is more preferably from 0.1 to 5 mass parts.

(The Wax)

The toner of the present invention may additionally contain a wax. There are no particular limitations on the wax used in the present invention, but the following are preferred examples:

hydrocarbon waxes such as low molecular weight polyethylene, low molecular weight polypropylene, microcrystalline wax, and paraffin wax; oxides of hydrocarbon waxes, such as oxidized polyethylene wax, and their block copolymers; fatty acid ester waxes such as carnauba wax, sasol wax, and montanic acid ester waxes; waxes provided by the partial or complete deacidification of fatty acid esters, such as deacidified carnauba wax; saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; aliphatic metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a polyhydric alcohol and a fatty acid, such as behenic monoglyceride; hydroxyl-containing methyl ester compounds obtained by the hydrogenation of plant oils; and long-chain alkyl alcohols and long-chain alkyl carboxylic acids that have at least 12 carbons. Preferred among the preceding from the standpoint of the balance between the releasability and the dispersibility in the resin are hydrocarbon waxes, fatty acid ester waxes, and saturated alcohols. A single one of these waxes may be used or as necessary two or more may be used in combination.

The melting point of the wax is preferably from at least 50° C. to not more than 200° C. and more preferably is from at least 55° C. to not more than 150° C. Having the melting point of the wax be in the indicated range makes it possible for the blocking resistance of the toner to co-exist in balance with the wax exudability during fixing.

The melting point referenced in the present invention is the peak temperature of the maximum endothermic peak in the differential scanning calorimetric (DSC) curve measured based on ASTM D 3418-82. Specifically, using a differential scanning calorimeter, the DSC curve is first obtained in the second temperature ramp-up process in a normal temperature, normal humidity environment using 30 to 200° C. for the temperature measurement range and using 5° C./min for the ramp rate. The melting point was taken to be the peak temperature of the maximum endothermic peak in the obtained DSC curve. A DSC822 from Mettler-Toledo was used as the differential scanning calorimeter.

The wax content in the toner, expressed as the total amount per 100 mass parts of the binder resin, is preferably from 1 to 25 mass parts and more preferably is from 3 to 10 mass parts. Having the wax content be in the indicated range makes it possible to bring the improvement in toner releasability into balanced co-existence with the inhibition of the melt adhesion by toner to the developer-bearing member and the surface of the electrostatic latent image bearing member.

A charge control agent can be incorporated on an optional basis in the toner of the present invention. This makes it possible to exercise control to an optimal triboelectric charge quantity in conformity to the developing system.

The known charge control agents can be used as this charge control agent, and a charge control agent is particularly preferred that can accelerate the charging speed and that can stably maintain a constant amount of charge. In addition, when the toner is produced by a direct polymerization method, a charge control agent is particularly preferred that has little ability to inhibit the polymerization and that is substantially not a substance soluble in the aqueous medium.

A charge control agent can be a negative-charging charge control agent that controls the toner to a negative charge or a positive-charging charge control agent that controls the toner to a positive charge.

The negative-charging charge control agents can be exemplified by polymers and copolymers that have a sulfonic acid group, sulfonate group, or sulfonate ester group; salicylic acid derivatives and their metal complexes; monoazo metal compounds; and aromatic oxycarboxylic acids and their metal salt resin-type charge control agents.

The positive-charging charge control agents can be exemplified by nigrosine and modifications of nigrosine by, for example, a fatty acid metal salt; guanidine compounds; imidazole compounds; quaternary ammonium salts such as tributylbenzylammonium 1-hydroxy-4-naphthosulfonate and tetrabutylammonium tetrafluoroborate and their analogous onium salts, e.g., the phosphonium salts, and their lake pigments; triphenylmethane dyes and their lake pigments (laking agent: phosphotungstic acid, phosphomolybdic acid, phosphotungstomolybdic acid, tannic acid, lauric acid, gallic acid, ferricyanide, or ferrocyanide); the metal salts of higher fatty acids; diorganotin oxides such as dibutyltin oxide, dioctyltin oxide, and dicyclohexyltin oxide; diorganotin borates such as dibutyltin borate, dioctyltin borate, and dicyclohexyltin borate; and resin-type charge control agents. A single one of these charge control agents may be used or two or more may be used in combination.

An inorganic fine powder may be externally added to the toner particles as a fluidizing agent in the toner of the present invention. This inorganic fine powder can be, for example, a fine powder of silica, titanium oxide, alumina, or their complex oxides, or the preceding that have been subjected to a surface treatment.

<The Toner Production Method>

There are no particular limitations on the toner production method, and a pulverization method, suspension polymerization method, suspension granulation method, emulsion polymerization method, or emulsion aggregation method may be used. The coloring compound with the structure given by general formula (1) may also be used in the developer used in liquid development methods (referred to below as a liquid developer).

(The Suspension Polymerization Method)

The suspension polymerization method is a toner production method that includes the step of dispersing in an aqueous medium a polymerizable monomer composition containing a polymerizable monomer and a colorant to produce particles of the polymerizable monomer composition and thereafter polymerizing the polymerizable monomer to produce toner particles.

The type of colorant can have an effect on the particle size distribution of the obtained toner in the suspension polymerization method.

However, the present inventors discovered that a toner with an excellent particle size distribution is obtained, even when the suspension polymerization method is used, when a phthalocyanine pigment having the structure given in general formula (1) is used as a colorant.

The suspension polymerization method is described in additional detail in the following.

A polymerizable monomer composition is first prepared by mixing a polymerizable monomer with a colorant that contains a coloring compound having the structure with general formula (1) and optionally with, for example, a wax, a polymerization initiator, and so forth.

This polymerizable monomer composition is then dispersed in an aqueous medium and particles of the polymerizable monomer composition are produced. The aqueous medium here may contain a dispersion stabilizer.

The polymerizable monomer in the particles of the polymerizable monomer composition in the aqueous medium is polymerized and the toner particles are subsequently obtained via filtration, washing, and drying.

The polymerizable monomer composition under consideration is preferably a polymerizable monomer composition prepared by mixing a second polymerizable monomer into a liquid dispersion prepared by the dispersion in a first polymerizable monomer of the colorant containing a coloring compound having the structure with general formula (1). That is, by thoroughly dispersing the colorant containing the coloring compound of the present invention with the first polymerizable monomer and then mixing this with the second polymerizable monomer and the other toner materials, the coloring compound can be incorporated in the toner particle in an even more favorably dispersed state.

The polymerizable monomer can be exemplified by the polymerizable monomers known for use for the binder resin of a toner.

Specific examples are styrene monomers such as styrene, o-methylstyrene, m-methylstyrene, p-methylstyrene, o-ethylstyrene, m-ethylstyrene, and p-ethylstyrene; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; olefinic monomers such as ethylene, propylene, butylene, butadiene, isoprene, isobutylene, and cyclohexene; vinyl halides such as vinyl chloride, vinylidene chloride, vinyl bromide, and vinyl iodide; vinyl esters such as vinyl acetate, vinyl propionate, and vinyl benzoate; vinyl ethers such as vinyl methyl ether, vinyl ethyl ether, and vinyl isobutyl ether; and vinyl ketone compounds such as vinyl methyl ketone, vinyl hexyl ketone, and methyl isopropenyl ketone. A single one of these may be used or two or more may be used in combination in accordance with the use application.

The polymerization initiator can be exemplified by the known polymerization initiators.

Examples are azo compounds, organoperoxides, inorganic peroxides, organometal compounds, and photopolymerization initiators. The polymerization initiator can be more specifically exemplified by azo-type polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis(isobutyrate); organoperoxide polymerization initiators such as benzoyl peroxide, di-tert-butyl peroxide, tert-butylperoxy isopropyl monocarbonate, tert-hexyl peroxybenzoate, and tert-butyl peroxybenzoate; inorganic peroxide polymerization initiators such as potassium persulfate and ammonium persulfate; and redox initiators such as the hydrogen peroxide-ferrous system, the BPO-dimethylaniline system, and the cerium(IV) salt-alcohol system. The photopolymerization initiator can be exemplified by acetophenone types, benzoin ether types, and ketal types. A single one of these polymerization initiators may be used or two or more may be used in combination.

The concentration of the polymerization initiator, expressed per 100 mass parts of the polymerizable monomer, is preferably from 0.1 to 20 mass parts and is more preferably from 0.1 to 10 mass parts. A single polymerization initiator or a mixture of polymerization initiators should be used with reference to the 10-hour half-life temperature.

The aqueous medium preferably contains a dispersion stabilizer. A known inorganic or organic dispersion stabilizer can be used as this dispersion stabilizer.

The inorganic dispersion stabilizers can be exemplified by calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina.

The organic dispersion stabilizers can be exemplified by polyvinyl alcohol, gelatin, methyl cellulose, methylhydroxypropyl cellulose, ethyl cellulose, the sodium salt of carboxymethyl cellulose, and starch.

A nonionic, anionic, or cationic surfactant may also be used. Examples here are sodium dodecyl sulfate, sodium tetradecyl sulfate, sodium pentadecyl sulfate, sodium octyl sulfate, sodium oleate, sodium laurate, potassium stearate, and calcium oleate.

The use is preferred in the present invention of a sparingly water-soluble inorganic dispersion stabilizer that is soluble in acid. When the aqueous medium is prepared using a sparingly water-soluble inorganic dispersion stabilizer, the amount of dispersion stabilizer addition is preferably from 0.2 to 2.0 mass parts per 100 mass parts of the polymerizable monomer. The drop stability of the polymerizable monomer composition in the aqueous medium is improved by having the amount of dispersion stabilizer addition be within the indicated range.

The aqueous medium is preferably prepared using 300 to 3,000 mass parts of the water per 100 mass parts of the polymerizable monomer composition.

When, in the present invention, the aqueous medium is prepared with such a sparingly water-soluble inorganic dispersion stabilizer dispersed therein, a commercial dispersion stabilizer may be directly used for dispersion, but preferably dispersion stabilizer particles are used that have a fine and uniform particle size. These dispersion stabilizer particles having a fine and uniform particle size are obtained by carrying out production by forming the sparingly water-soluble inorganic dispersion stabilizer in water under high-speed stirring. For example, when calcium phosphate is used as the sparingly water-soluble dispersion stabilizer, the calcium phosphate particles can be formed by mixing an aqueous sodium phosphate solution with an aqueous calcium chloride solution under high-speed stirring.

(The Suspension Granulation Method)

For the toner of the present invention, a toner having a favorable particle size distribution can also be obtained when production is carried out by the suspension granulation method.

Since the production sequence in the suspension granulation method lacks a heating step, the compatibilization between the wax and resin that occurs when a low melting point wax is used can be prevented and the decline in the glass-transition temperature of the toner that is caused by compatibilization can thus be suppressed. In addition, the suspension granulation method supports a broadening of the choices for the binder resin and facilitates the use of polyester resin, which is generally favorable for the fixing performance, as the main component. Due to this, the suspension granulation method is a favorable production method when a toner is to be produced from a resin composition that is difficult to produce and cannot be used in the suspension polymerization method.

Toner particles can be produced by the suspension granulation method, for example, as follows.

First, a solvent composition is prepared by mixing the following in a solvent: the binder resin and the colorant containing the coloring compound with the structure given in general formula (1) and the other optional toner components such as wax and so forth. This solvent composition is dispersed in an aqueous medium and particles of the solvent composition are produced to obtain a toner particle suspension. The toner particles can then be obtained by removing the solvent by heating the obtained suspension or reducing the pressure.

The solvent composition is preferably prepared by mixing a second solvent with a liquid dispersion prepared by the dispersion in a first solvent of the colorant containing a coloring compound having the structure with general formula (1). That is, by thoroughly dispersing the colorant containing the coloring compound of the present invention in the first solvent and then mixing this with the second solvent and the other toner materials, the coloring compound can be incorporated in the toner particle in an even more favorably dispersed state.

Solvents usable in the suspension granulation method can be exemplified by hydrocarbons such as toluene, xylene, and hexane; halocarbons such as methylene chloride, chloroform, dichloroethane, trichloroethane, and carbon tetrachloride; alcohols such as methanol, ethanol, butanol, and isopropyl alcohol; polyhydric alcohols such as ethylene glycol, propylene glycol, diethylene glycol, and triethylene glycol; cellosolves such as methyl cellosolve and ethyl cellosolve; ketones such as acetone, methyl ethyl ketone, and methyl isobutyl ketone; ethers such as benzyl alcohol ethyl ether, benzyl alcohol isopropyl ether, and tetrahydrofuran; and esters such as methyl acetate, ethyl acetate, and butyl acetate.

A single one of these may be used or a mixture of two or more may be used. Among the preceding, the use is preferred of a solvent that can satisfactorily dissolve the binder resin and that has a low boiling point in order to easily remove the solvent in the toner particle suspension.

The amount of use of the solvent, expressed per 100 mass parts of the binder resin, is preferably from 50 to 5,000 mass parts and more preferably is from 120 to 1,000 mass parts.

The aqueous medium used by the suspension granulation method preferably contains a dispersion stabilizer. A known inorganic dispersion stabilizer or a known organic dispersion stabilizer can be used as this dispersion stabilizer. For example, the dispersion stabilizers provided as examples of the dispersion stabilizers used in the previously described suspension polymerization method can be used. An amount of use for the dispersion stabilizer from 0.01 to 20 mass parts per 100 mass parts of the binder resin is preferred from the standpoint of improving the drop stability of the solvent composition in the aqueous medium.

The amount of addition of the coloring compound having the structure given by general formula (1) in the suspension polymerization method and suspension granulation method, with reference to 100 mass parts of the binder resin or the polymerizable monomer, is preferably from 1.0 to 100.0 mass parts and more preferably is from 3.0 to 70.0 mass parts.

The total amount of wax addition in the suspension polymerization method and suspension granulation method, with reference to the binder resin or 100 mass parts of the polymerizable monomer, is preferably from 1 to 25 mass parts and more preferably from 3 to 10 mass parts. Having the quantity of wax addition be in the indicated range makes it possible to bring the improvement in toner releasability into balanced co-existence with the inhibition of melt adhesion by the toner to the developer bearing member and the electrostatic latent image bearing member.

The coloring dispersion described below may be used in the suspension polymerization method and suspension granulation method as the colorant containing the coloring compound of the present invention with the structure given by general formula (1). The use of a coloring dispersion makes it possible to suppress a viscosity increase in the aqueous medium and as a consequence facilitates handling during the toner production process, while also keeping an excellent dispersibility for the colorant and as a consequence can provide a toner that has a high tinting strength.

The coloring dispersion is obtained by dispersing the coloring compound with the structure given in general formula (1) in a dispersion medium. The following method is an example of a specific production method.

The coloring compound having the structure with general formula (1) is introduced into an organic solvent, which is the dispersion medium and in which the polymerizable monomer or resin has been dissolved, and the dispersion medium is thoroughly mixed using, for example, a stirrer. The coloring dispersion is obtained by finely and stably dispersing the coloring compound into a uniform microparticulate form through the application of a mechanical shear force using a disperser such as a ball mill, paint shaker, dissolver, attritor, sand mill, or high-speed mill. The dispersion medium can be exemplified by water, an organic solvent (including the polymerizable monomer), and their mixtures.

The amount of the coloring compound having the structure with general formula (1) in the coloring dispersion in the present invention is preferably from 1.0 to 30 mass parts per 100 mass parts of the dispersion medium. From 2.0 to 20 mass parts is more preferred and from 3.0 to 15 mass parts is even more preferred. When the coloring compound content is in the indicated range, this can prevent an increase in viscosity and can prevent a reduction in the dispersibility of the coloring compound and makes possible the generation of an excellent tinting strength.

Examples of the organic solvents that can be used as the dispersion medium in the coloring dispersion are as follows:

alcohols such as methyl alcohol, ethyl alcohol, modified ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; glycols such as methyl cellosolve, ethyl cellosolve, diethylene glycol, and diethylene glycol monobutyl ether; ketones such as acetone, methyl ethyl ketone, and methyl isobutyl ketone; esters such as ethyl acetate, butyl acetate, ethyl propionate, and cellosolve acetate; hydrocarbon solvents such as hexane, octane, petroleum ether, cyclohexane, benzene, toluene, and xylene; halogenated hydrocarbon solvents such as carbon tetrachloride, trichloroethylene, and tetrabromoethane; ethers such as diethyl ether, dimethyl glycol, trioxane, and tetrahydrofuran; acetals such as methylal and diethyl acetal; organic acids such as formic acid, acetic acid, and propionic acid; and sulfur-containing or nitrogen-containing organic compounds such as nitrobenzene, dimethylamine, monoethanolamine, pyridine, dimethyl sulfoxide, and dimethylformamide.

The polymerizable monomer can also be used as the organic solvent.

The polymerizable monomer is an addition-polymerizable monomer or a condensation-polymerizable monomer and is preferably an addition-polymerizable monomer.

Specific examples are styrene monomers such as styrene, o-methylstyrene, m-methylstyrene, p-methylstyrene, o-ethylstyrene, m-ethylstyrene, and p-ethylstyrene; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; olefinic monomers such as ethylene, propylene, butylene, butadiene, isoprene, isobutylene, and cyclohexene; vinyl halides such as vinyl chloride, vinylidene chloride, vinyl bromide, and vinyl iodide; vinyl esters such as vinyl acetate, vinyl propionate, and vinyl benzoate; vinyl ethers such as vinyl methyl ether, vinyl ethyl ether, and vinyl isobutyl ether; and vinyl ketone compounds such as vinyl methyl ketone, vinyl hexyl ketone, and methyl isopropenyl ketone.

A single one of these or a combination of two or more may be used in conformity with the use application. When toner production is carried out using the previously described coloring dispersion, the use is preferred among these polymerizable monomers of styrene or a styrene monomer, either by itself or mixed with another polymerizable monomer. Styrene is particularly preferred for its ease of handling.

A resin may also be added to the coloring dispersion. Specific examples are as follows:

polystyrene resins, styrene copolymers, polyacrylic acid resins, polymethacrylic acid resins, polyacrylate ester resins, polymethacrylate ester resins, acrylic acid copolymers, methacrylic acid copolymers, polyester resins, polyvinyl ether resins, polyvinyl methyl ether resins, polyvinyl alcohol resins, polyvinyl butyral resins, polyurethane resins, and polypeptide resins.

A single one of these resins may be used or a mixture of two or more may be used.

Other colorants may also be used in the coloring dispersion as long as there is no interference with the dispersibility in the dispersion medium of the coloring compound having the structure with general formula (1). The co-used colorant can be exemplified by compounds as typified by condensed azo compounds, anthraquinone compounds, azo-metal complexes, methine compounds, and allylamide compounds.

(The Pulverization Method)

The toner of the present invention having a favorable particle size distribution can also be obtained by toner production by the pulverization method.

Toner particles can be produced by the pulverization method, for example, as follows.

The binder resin and the colorant containing a coloring compound having the structure given by general formula (1) and as necessary a wax, charge control agent, and other additives are thoroughly mixed using a mixer such as Henschel mixer or a ball mill. Melting is then carried out using a heated kneader such as a roll, kneader, or extruder. Dispersion of the wax and colorant is also brought about while the resins are being miscibilized with each other by the mixing and kneading. After cooling and solidification, the toner particles can then be obtained by pulverization and classification.

Production equipment, e.g., the mixer, hot kneader, classifier used for classification, and so forth, as known to the individual skilled in the art can be used.

The binder resin can be exemplified by vinyl resins, polyester resins, epoxy resins, polyurethane resins, polyvinyl butyral resins, terpene resins, phenolic resins, aliphatic hydrocarbon resins and alicyclic hydrocarbon resins, and aromatic petroleum resins. Among these, vinyl resins and polyester resins are preferred from the standpoint of the charging performance and fixing performance. The use of polyester resins is particularly preferred because they have a substantial effect on the charging performance and fixing performance. A single one of these resins may be used or two or more may be used in combination. When a mixture of two or more resins is used, a resin with a different molecular weight may also be admixed in order to control the viscoelastic characteristics of the toner.

The glass-transition temperature of the binder resin is preferably from 45 to 80° C. and is more preferably from 55 to 70° C. The number-average molecular weight (Mn) of the binder resin is preferably from 2,500 to 50,000 and the weight-average molecular weight (Mw) is preferably from 10,000 to 1,000,000.

(The Emulsion Aggregation Method)

The toner of the present invention having a favorable particle size distribution can also be obtained by toner production by the emulsion aggregation method.

An example of toner particle production by the emulsion aggregation method is provided in the following.

A resin particle dispersion, a wax dispersion, a colorant particle dispersion, and as necessary a dispersion containing other toner components are first prepared. A liquid mixture is prepared by mixing these dispersions; a pH modifier, aggregating agent, stabilizer, and so forth are added and mixed into this liquid mixture; and aggregate particles are formed in which the individual particles are aggregated (aggregation step). The aggregate particles are subsequently heated to induce fusion (fusion step) and toner particles are then obtained via a filtration and washing step and a drying step.

A dispersing agent, for example, a surfactant, can be used in the various particle dispersions. For example, the colorant particle dispersion can be prepared by dispersing the colorant in an aqueous medium in combination with a surfactant. Here, the colorant particles can be dispersed in the aqueous medium by a known method; for example, a rotational shear-type homogenizer, or a media-based disperser such as a ball mill, sand mill, or attritor, or a high-pressure counter collision-type disperser is preferably used.

The dispersing agent can be exemplified by water-soluble polymers, inorganic compounds, and ionic and nonionic surfactants. In view, in particular, of the concern with dispersibility, a surfactant is preferred and the use of an anionic surfactant is particularly preferred.

Viewed from the standpoint of the washability and surface activity, the molecular weight of the surfactant is preferably from 100 to 10,000 and more preferably is from 200 to 5,000.

The dispersing agent can be specifically exemplified by water-soluble polymers such as polyvinyl alcohol, methyl cellulose, carboxymethyl cellulose, and sodium polyacrylate; surfactants such as anionic surfactants (e.g., sodium dodecylbenzenesulfonate, sodium octadecyl sulfate, sodium oleate, sodium laurate, and potassium stearate), cationic surfactants (e.g., laurylamine acetate and lauryltrimethylammonium chloride), amphoteric surfactants (e.g., lauryldimethylamine oxide), and nonionic surfactants (e.g., polyoxyethylene alkyl ether, polyoxyethylene alkylphenyl ether, and polyoxyethylene alkylamine); and inorganic compounds such as tricalcium phosphate, aluminum hydroxide, calcium sulfate, calcium carbonate, and barium carbonate.

A single one of the preceding may be used or as necessary two or more may be used in combination.

[The Wax Dispersion]

The wax dispersion referenced above is made by dispersing a wax in an aqueous medium. The wax dispersion is prepared by known methods. The total wax content, expressed per 100 mass parts of the resin particles (solids fraction), is preferably from 1 to 25 mass parts and more preferably is from 3 to 10 mass parts.

[The Resin Particle Dispersion]

The resin particle dispersion referenced above is made by dispersing resin particles in an aqueous medium.

This aqueous medium denotes a medium in which water is the majority component. The aqueous medium can be specifically exemplified by water itself, water to which a pH modifier has been added, and water to which an organic solvent has been added.

There are no particular limitations on the resin constituting the resin particles in the resin particle dispersion as long as this resin is suitable for a toner with the properties described below, but for an electrophotographic apparatus a thermoplastic binder resin is preferred that has a glass-transition temperature that does not exceed the fixation temperature.

Specific examples are the homopolymers of styrenes (e.g., styrene, para-chlorostyrene, and α-methylstyrene), vinyl monomers (e.g., methyl acrylate, ethyl acrylate, n-propyl acrylate, lauryl acrylate, 2-ethylhexyl acrylate, methyl methacrylate, ethyl methacrylate, n-propyl methacrylate, lauryl methacrylate, 2-ethylhexyl methacrylate, acrylonitrile, and methacrylonitrile), vinyl ether monomers (e.g., vinyl methyl ether and vinyl isobutyl ether), vinyl ketone monomers (e.g., vinyl methyl ketone, vinyl ethyl ketone, and vinyl isopropenyl ketone), and polyolefin monomers (e.g., ethylene, propylene, and butadiene); copolymers obtained from a combination of two or more of the preceding; mixtures of these homopolymers and copolymers; and also non-vinylic condensation resins such as epoxy resins, polyester resins, polyurethane resins, polyamide resins, cellulose resins, and polyether resins, as well as their mixtures with the previously described vinyl resins and the graft polymers obtained by the polymerization in their presence of a vinyl monomer. Considered in particular from the standpoint of the fixing performance and charging performance as a toner, the use is particularly preferred of a polystyrene resin or a polyester resin. A single one of these resins may be used or two or more may be used in combination.

The resin particle dispersion referenced above is produced by a known method. For example, in the case of a resin particle dispersion that contains resin particles constituted of vinyl monomer and particularly styrene monomer, the resin particle dispersion can be prepared by running an emulsion polymerization on the monomer using a surfactant and so forth. In the case of a resin (for example, a polyester resin) produced by a method other than emulsion polymerization, the resin dissolved in an organic solvent is dispersed, using a disperser such as a homogenizer, in an aqueous solution in which an ionic surfactant and a polyelectrolyte are dissolved. The resin particle dispersion can then be produced by vaporizing the solvent.

The resin particle dispersion may also be prepared by phase-transfer emulsification or by a method in which surfactant is added to the resin and emulsification and dispersion in water is carried out using a disperser, e.g., a homogenizer.

The volume-based median diameter of the resin particles in the resin particle dispersion is preferably from 0.005 to 1.0 μm and is more preferably from 0.01 to 0.4 μm.

The volume-based median diameter of the resin particles can be measured using, for example, a dynamic light scattering method (DLS), a laser scattering method, a centrifugal sedimentation method, a field-flow fractionation method, or an electrical sensing method. Unless specifically indicated otherwise, the volume-based median diameter in the present invention denotes the volume-based 50% cumulative particle diameter value (D50) measured by a dynamic light scattering (DLS)/laser Doppler method at 20° C. for a solid concentration of 0.01 mass %.

[The Colorant Particle Dispersion]

The colorant particle dispersion is made by dispersing, in an aqueous medium, a colorant that contains a coloring compound with the structure given by general formula (1).

In an example of a specific method of producing the colorant particle dispersion, production can be carried out by introducing a coloring compound with the structure given by general formula (1) into an aqueous solution in which an ionic surfactant and a polyelectrolyte are dissolved and effecting dispersion using a known disperser such as a rotational shear-type homogenizer, or a media-based disperser such as a ball mill, sand mill, or attritor, or a high-pressure counter collision-type disperser.

The content of the coloring compound with the structure given by general formula (1) is preferably from 1 to 20 mass parts per 100 mass parts of the resin particles (solids fraction).

On the other hand, the use amount for the surfactant, expressed per 100 mass parts of the colorant containing a compound with the structure given by general formula (1), is preferably from 0.01 to 10 mass parts and more preferably from 0.1 to 5.0 mass parts. The use of 0.5 mass parts to 3.0 mass parts is even more preferred in order to provide for the facile removal of the surfactant in the toner particles. The presence of little residual surfactant in the obtained toner supports the appearance of the effects of a high toner image density and a suppression of fogging.

[The Aggregation Step]

There are no particular limitations on the method for forming the aggregate particle in which the respective particles are aggregated, but in an example of a preferred method, a pH modifier, aggregating agent, and dispersion stabilizer are added and mixed into the liquid mixture of the individual dispersions described above and a suitable temperature and mechanical force (stirring) are applied.

The pH modifier is not particularly limited and can be exemplified by bases such as ammonia and sodium hydroxide and by acids such as nitric acid and citric acid.

The aggregating agent is not particularly limited and can be exemplified by inorganic metal salts such as sodium chloride, magnesium carbonate, magnesium chloride, magnesium nitrate, magnesium sulfate, calcium chloride, and aluminum sulfate and also by the complexes of divalent or higher valent metals.

There are no particular limitations on the dispersion stabilizer, and it can be exemplified by water-soluble polymers such as polyvinyl alcohol, methyl cellulose, carboxymethyl cellulose, and sodium polyacrylate; anionic surfactants such as sodium dodecylbenzenesulfonate, sodium octadecyl sulfate, sodium oleate, sodium laurate, and potassium stearate; cationic surfactants such as laurylamine acetate and lauryltrimethylammonium chloride; amphoteric surfactants such as lauryldimethylamine oxide; nonionic surfactants such as polyoxyethylene alkyl ether, polyoxyethylene alkylphenyl ether, and polyoxyethylene alkylamine; and inorganic compounds such as tricalcium phosphate, aluminum hydroxide, calcium sulfate, calcium carbonate, and barium carbonate.

A single one of these may be used or as necessary a combination of two or more may be used.

The average particle diameter of the thusly obtained aggregate particles is not particularly limited, but generally is controlled so as to be approximately the same as the weight-average particle diameter (D4) of the toner particle that will be obtained. The particle diameter of this aggregate can be readily controlled by suitably setting and altering the temperature when the aggregating agent is added and intermixed and by suitably setting and altering the conditions during the above-described stirring and mixing. In addition, a suitable introduction of, for example, the above-described pH modifier and surfactant is preferably carried out in order to prevent toner particle-to-toner particle melt adhesion.

[The Fusion Step]

The toner particle is formed in the fusion step by heating and fusing the aggregate particle.

The heating temperature should be between the glass-transition temperature (Tg) of the resin present in the aggregate particle and the decomposition temperature of the resin. For example, the aggregate particle can be fused and unified into one by stirring as in the aggregation step and heating to a temperature that is at least the glass-transition temperature of the resin in the resin particles while preventing the occurrence of aggregation by the addition of, for example, a surfactant or pH modifier.

The heating time should be sufficient to provide a satisfactory fusion and in specific terms heating will be carried out for about 10 minutes to 10 hours.

In addition, the fusion step may additionally be preceded and followed by a step (the attachment step) in which a core•shell structure is formed by the attachment of fine particles to the aggregate particle by the addition with mixing of a fine particle dispersion in which fine particles are dispersed.

[The Washing Step]

The toner particles are obtained by subjecting the toner particles obtained from the fusion step to washing, filtration, drying, and so forth under suitable conditions. In this case, the toner particles are preferably thoroughly washed in order to secure a satisfactory reliability and satisfactory charging characteristics for the toner.

There are no particular limitations on the washing method. As an example, the toner particle-containing suspension is filtered; the obtained residue is stirred and washed using distilled water; and this is again filtered. Viewed from the standpoint of the charging performance of the toner, washing is preferably repeated until the electrical conductivity of the filtrate reaches 150 μS/cm or less. When the electrical conductivity is greater than 150 μS/cm, the charging characteristics of the toner decline and as a result fogging and a decline in the image density are readily produced.

An inorganic powder, e.g., of silica, alumina, titania, calcium carbonate, and so forth, and/or resin particles, e.g., of a vinyl resin, polyester resin, silicone resin, and so forth, may be added to the surface of the obtained toner particles by the application of shear force in the dry state. This inorganic powder and the resin particles function as external additives, e.g., as a flowability assistant, a cleaning assistant, and so forth.

[The Drying Step]

Drying can use a known method, such as an ordinary vibrating fluidized drying method, spray drying method, freeze-drying method, or flash jet method. The post-drying water content in the toner particles is preferably not more than 1.5 mass % and is more preferably not more than 1.0 mass %.

The toner has a weight-average particle diameter (D4) of preferably 4.0 to 9.0 μm and more preferably 4.9 to 7.5 μm. Having the weight-average particle diameter (D4) of the toner be in the indicated range provides additional improvements in the charge stability during long-run printing and in the reproducibility of halftone areas.

The ratio between the weight-average particle diameter (D4) and the number-average particle diameter (D1) (also referred to below as weight-average particle diameter/number-average particle diameter or [D4/D1]) for the toner is preferably not more than 1.35 and more preferably is not more than 1.30. The fogging and transferability can be improved and the scatter in the line width thickness, e.g., for thin lines, can be kept down by having the [D4/D1] of the toner be in the indicated range.

The method for adjusting the weight-average particle diameter (D4) and the number-average particle diameter (D1) of the toner varies depending on the particular method for producing the toner particles. For example, in the suspension polymerization method, the adjustment can be carried out, for example, by controlling the concentration of the dispersing agent used during preparation of the aqueous dispersion medium and by controlling the reaction stirring speed and the reaction stirring time.

Viewed in terms of improving the transferability, the toner of the present invention has an average toner circularity, as measured with a flow particle image analyzer, of preferably 0.930 to 0.995 and more preferably 0.960 to 0.990.

The toner of the present invention may be a magnetic toner or a nonmagnetic toner.

For use as a magnetic toner, the toner particles constituting the toner of the present invention are used mixed with a magnetic material. This magnetic material can be exemplified by iron oxides such as magnetite, maghemite, and ferrite; iron oxides that contain another metal oxide; and metals such as Fe, Co, and Ni and alloys and mixtures of these metals with metals such as Al, Co, Cu, Pb, Mg, Ni, Sn, Zn, Sb, Be, Bi, Cd, Ca, Mn, Se, Ti, W, and V.

(The Method of Producing a Liquid Developer)

The method of producing a liquid developer is described in the following.

First, to obtain a liquid developer, production is carried out by dispersing or dissolving, in a dielectric liquid carrier, a binder resin and a colorant containing a coloring compound with the structure shown in general formula (1) and as necessary auxiliaries such as a charge control agent and wax. In addition, production may be carried out by a two-step method in which the toner of the present invention is produced and this is diluted with the dielectric liquid carrier to produce the developer.

The disperser used for dispersion here is not particularly limited, and, for example, a rotational shear-type homogenizer, or a media-based disperser such as a ball mill, sand mill, or attritor, or a high-pressure counter collision-type disperser is preferably used.

Besides the coloring compound having the structure with general formula (1), the colorant may also use a single known pigment or dye or a combination of two or more known pigments and/or dyes.

The wax has the same description as already provided with reference to the toner.

The charge control agent should be a charge control agent as used in liquid developers for electrostatic development, but is not otherwise particularly limited. It can be exemplified by cobalt naphthenate, copper naphthenate, copper oleate, cobalt oleate, zirconium octylate, cobalt octylate, sodium dodecylbenzenesulfonate, calcium dodecylbenzenesulfonate, soy lecithin, and aluminum octoate.

There are no particular limitations on the dielectric liquid carrier, and, for example, the use is preferred of an organic solvent that has a high electrical resistance of at least $1\times10^9$ Ω·cm and a low dielectric constant of not more than 3.

Specific examples are aliphatic hydrocarbon solvents such as hexane, pentane, octane, nonane, decane, undecane, and dodecane, as well as Isopar H, G, K, L, and M (Exxon Chemical) and Linealene Dimer A-20 and A-20H (Idemitsu Kosan Co., Ltd.). A boiling point in the temperature range from 68 to 250° C. is preferred. Within a range that avoids a high system viscosity, a single one of these may be used or two or more may be used in combination.

EXAMPLES

The present invention is described in additional detail through the following examples and comparative examples, but the present invention is not limited to or by these examples. Unless specifically indicated otherwise, "parts" and "%" in the text are on a mass basis.

A nuclear magnetic resonance instrument ($^1$H-NMR, product name: ECA-400, JEOL Ltd.) was used as the analytical instrumentation for confirming the structure of the obtained coloring compounds.

Synthesis of dichlorosilylphthalocyanine

Under a nitrogen atmosphere, tetrachlorosilane (1.8 parts) was added dropwise to a quinoline (10 parts) dispersion of 1,3-diiminoisoindoline (1.0 part) while paying attention to heat evolution. After the completion of the addition, the temperature was raised to 230° C. and stirring was performed for 5 hours. After the completion of the reaction, cooling to room temperature was carried out and the solid was filtered off under reduced pressure. The obtained solid was dispersed in N,N-dimethylformamide (abbreviated as DMF) and the temperature was raised to 80° C. A hot filtration was performed to obtain dichlorosilylphthalocyanine (yield=70%), which is a diaxial phthalocyanine.

〈Coloring Compound Production Example 1: Production of the Compound (1) Described Above〉

Under a nitrogen atmosphere, 60% sodium hydride (0.5 parts) was added in small portions to a toluene (10 parts) solution of cyclohexanemethanol (0.76 parts). The above-described dichlorosilylphthalocyanine (1.0 part) was then added in small portions, followed by heating under reflux for 5 hours. After the completion of the reaction, dilution was carried out with n-hexane (50 parts) and the precipitated solid was filtered off. The obtained solid was washed with ethanol and ion-exchanged water to obtain a coloring compound (1) [compound (1)] of the present invention (yield=85%).

[Analytical Results for Compound (1)]

$^1$H-NMR (400 MHz, DMF-d7, room temperature): δ (ppm)=9.75 (8H, dd), 8.55 (8H, dd), 0.39 (4H, s), 0.22 (6H, d), 1.12 (4H, s), 1.74 (8H, d), 2.29 (4H, d)

⟨Coloring Compound Production Example 2: Production of the Compound (13) Described Above⟩

A coloring compound (2) [compound (13)] of the present invention was obtained (yield=78%) by carrying out production using the same method as in Production Example 1, but changing the cyclohexanemethanol in Production Example 1 to adamantylmethanol (1.1 parts).

[Analytical Results for Compound (13)]

$^1$H-NMR (400 MHz, DMF-d7, room temperature): δ (ppm)=9.76 (8H, s), 8.54 (8H, s), 0.78 (16H, m), 0.26 (5H, s), 2.54 (3H, s)

⟨Coloring Compound Production Example 3: Production of the Compound (17) Described Above⟩

A coloring compound (3) [compound (17)] of the present invention was obtained (yield=82%) by carrying out production using the same method as in Production Example 1, but changing the cyclohexanemethanol in Production Example 1 to norbornane-2-methanol (1.0 part).

[Analytical Results for Compound (17)]

$^1$H-NMR (400 MHz, DMF-d7, room temperature): δ (ppm)=9.75 (8H, dd), 8.56 (8H, dd), 0.59 (4H, dd), −1.26 (4H, dd), 1.74 (12H, m)

Synthesis of tert-butyldichlorosilylphthalocyanine

Under a nitrogen atmosphere, tetrachlorosilane (1.8 parts) was added dropwise to a quinoline (10 parts) dispersion of 5-t-Bu-1,3-diiminoisoindoline (1.0 part) while paying attention to heat evolution. After the completion of the addition, the temperature was raised to 230° C. and stirring was performed for 5 hours. After the completion of the reaction, cooling to room temperature was carried out and the solid was filtered off under reduced pressure. The obtained solid was dispersed in N,N-dimethylformamide (abbreviated as DMF) and the temperature was raised to 80° C. A hot filtration was performed to obtain tert-butyldichlorosilylphthalocyanine (yield=73%), which is a diaxial phthalocyanine.

⟨Coloring Compound Production Example 4: Production of the Compound (35) Described Above⟩

Under a nitrogen atmosphere, 60% sodium hydride (0.5 parts) was added in small portions to a toluene (10 parts) solution of adamantylmethanol (1.1 parts). The above-described tert-butyldichlorosilylphthalocyanine (1.0 part) was then added in small portions, followed by heating under reflux for 5 hours. After the completion of the reaction, dilution was carried out with n-hexane (50 parts) and the precipitated solid was filtered off.

The obtained solid was washed with ethanol and ion-exchanged water to obtain a coloring compound (4) [compound (35)] of the present invention (yield=76%).

[Analytical Results for Compound (35)]

$^1$H-NMR (400 MHz, DMF-d7, room temperature): δ (ppm)=9.78 (8H, s), 8.56 (8H, s), 2.54 (3H, s), 1.35 (36H, s), 0.81 (16H, m), 0.26 (5H, s)

⟨Coloring Compound Production Example 5: Production of the Compound (40) Described Above⟩

A coloring compound (5) [compound (40)] of the present invention was obtained (yield=83%) by carrying out production using the same method as in Production Example 4, but changing the adamantylmethanol (1.1 parts) in Production Example 4 to cyclohexanemethanol (0.76 parts).

[Analytical Results for Compound (40)]

$^1$H-NMR (400 MHz, DMF-d7, room temperature): δ (ppm)=9.75 (8H, dd), 8.55 (8H, dd), 0.39 (4H, s), 0.22 (6H, d), 1.12 (4H, s), 1.74 (8H, d), 2.29 (4H, d), 1.29 (36H, s)

⟨Coloring Compound Production Example 6: Production of the Compound (41) Described Above⟩

A coloring compound (6) [compound (41)] of the present invention was obtained (yield=80%) by carrying out production using the same method as in Production Example 4, but changing the adamantylmethanol (1.1 parts) in Production Example 4 to norbornane-2-methanol (1.0 part).

[Analytical Results for Compound (41)]

$^1$H-NMR (400 MHz, DMF-d7, room temperature): δ (ppm)=9.75 (8H, dd), 8.56 (8H, dd), 0.59 (4H, dd), 1.26 (4H, dd), 1.74 (12H, m), 1.32 (36H, s)

[Toner Production]

Toners according to the present invention and comparative toners were produced using the methods described below.

Example 1

A coloring dispersion (1) was obtained by carrying out dispersion for 3 hours on a mixture of 12 parts of the coloring compound (1) [compound (1)] and 120 parts of styrene using an attritor (Mitsui Mining Co., Ltd.).

710 parts of ion-exchanged water and 450 parts of a 0.1 mol/L aqueous trisodium phosphate solution were added to a 2 L four-neck flask equipped with a T.K. Homomixer (PRIMIX Corporation) high-speed stirrer, and the stirring rate was adjusted to 12,000 rpm and the temperature was raised to 60° C. To this was gradually added 68 parts of a 1.0 mol/L aqueous calcium chloride solution to produce an aqueous medium that contained calcium phosphate, a microfine, sparingly water-soluble dispersion stabilizer.

The following materials were then heated to 60° C. and mixed at 5,000 rpm using a T.K. Homomixer.

| | |
|---|---|
| coloring dispersion (1) | 133.2 parts |
| styrene | 46.0 parts |
| n-butyl acrylate | 34.0 parts |
| aluminum salicylate compound (Bontron E-88 from Orient Chemical Industries Co., Ltd.) | 2.0 parts |
| polar resin (polycondensate of isophthalic acid and propylene oxide modified-bisphenol A, glass-transition temperature (Tg) = 65° C., weight-average molecular weight (Mw) = 10,000, number-average molecular weight (Mn) = 6,000) | 10.0 parts |
| ester wax (70° C. = peak temperature of the maximum endothermic peak in DSC measurement, Mn = 704) | 25.0 parts |
| divinylbenzene | 0.10 parts |

Into this was dissolved 10 parts of 2,2'-azobis(2,4-dimethylvaleronitrile), which is a polymerization initiator, to produce a polymerizable monomer composition. This polymerizable monomer composition was introduced into the aqueous medium described above and particle production was performed for 15 minutes while maintaining a stirring rate of 12,000 rpm. The high-speed stirrer was then replaced with a stirrer equipped with propeller stirring blades and polymerization was continued for 5 hours at a liquid temperature of 60° C.; the liquid temperature was then raised to 80° C.; and the polymerization was continued for 8 hours. After the end of the polymerization reaction, the residual monomer was distilled out at 80° C. under reduced pressure and the liquid temperature was then cooled to 30° C. to obtain a dispersion of fine polymer particles.

This dispersion of fine polymer particles was transferred to a wash container and, while stirring, dilute hydrochloric acid was added to adjust the pH to 1.5 and stirring was performed for 2 hours. Solid-liquid separation was performed on a filter to obtain fine polymer particles. Redispersion of the fine polymer particles in water and solid-liquid separation were performed repeatedly until the compounds of calcium and phosphoric acid, including calcium phosphate, had been thoroughly removed. The fine polymer particles provided by the final solid-liquid separation were thoroughly dried with a drier to obtain a toner particle (1).

The following were dry mixed for 5 minutes using a Henschel mixer (Nippon Coke & Engineering Co., Ltd.) with 100 parts of the obtained toner particles to obtain a toner (1): 1.00 part of a hydrophobic silica fine powder (primary particle number-average particle diameter=7 nm) that had been surface-treated with hexamethyldisilazane, 0.15 parts of a rutile titanium oxide fine powder (primary particle number-average particle diameter=45 nm), and 0.50 parts of a rutile titanium oxide fine powder (primary particle number-average particle diameter=200 nm).

Examples 2 to 6

Toners (2) to (6) were obtained proceeding as in Example 1, but changing the compound (1) in Example 1 to compound (13), (17), (35), (40), and compound (41), respectively.

Example 7

A toner (7) was obtained proceeding as in Example 1, but using the following two compounds in place of the 12 parts of compound (1) used in Example 1: 6 parts compound (1) and 6 parts C. I. Pigment Blue 15:3 (P.B. 15:3).

Comparative Examples 1 and 2

Toners (Comparative 1 and Comparative 2) were obtained proceeding as in Example 1, but changing the compound (1) in Example 1 to the following comparative compound (1) and comparative compound (2), respectively.

[C9]

comparative compound (1)

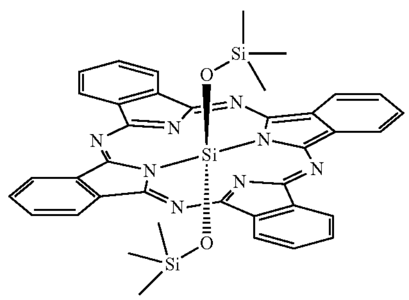

-continued comparative compound (2)

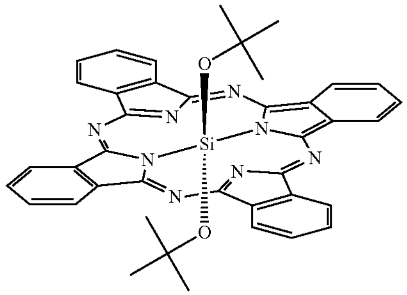

Example 8

The following were mixed and dissolved: 82.6 parts of styrene, 9.2 parts of n-butyl acrylate, 1.3 parts of acrylic acid, 0.4 parts of hexanediol acrylate, and 3.2 parts of n-lauryl mercaptan. To this solution was added an aqueous solution of 150 parts of ion-exchanged water that contained 1.5 parts of Neogen RK (Dai-ichi Kogyo Seiyaku Co., Ltd.) and dispersion was carried out. While slowly stirring for an additional 10 minutes, an aqueous solution of 10 parts of ion-exchanged water containing 0.15 parts of potassium persulfate was added. After nitrogen substitution, an emulsion polymerization was run for 6 hours at 70° C. After the end of the polymerization, the reaction solution was cooled to room temperature and a resin particle dispersion having a volume-based median diameter of 0.2 μm and a solids concentration of 12.5 mass % was obtained by the addition of ion-exchanged water.

100 parts of an ester wax (70° C.=peak temperature of the maximum endothermic peak by DSC measurement, Mn=704) and 15 parts of Neogen RK were mixed into 385 parts of ion-exchanged water and a wax particle dispersion was then obtained by dispersing for about 1 hour using a JN100 wet jet mill (JOKOH Co., Ltd.). This wax particle dispersion had a solids concentration of 20 mass %.

100 parts of compound (1) and 15 parts of an anionic surfactant (Neogen RK, Dai-ichi Kogyo Seiyaku Co., Ltd.) were mixed into 885 parts of ion-exchanged water and a colorant particle dispersion (1) was then obtained by dispersing for about 1 hour using a JN100 wet jet mill (JOKOH Co., Ltd.).

The volume-based median diameter of the colorant particles was 0.15 μm.

160 parts of the resin particle dispersion, 10 parts of the wax particle dispersion, 10 parts of the colorant particle dispersion (1), and 0.2 parts of magnesium sulfate were dispersed using a homogenizer (IKA: Ultra-Turrax T50) followed by heating to 65° C. After stirring for 1 hour at 65° C., the formation of aggregate particles having an average particle diameter of about 5.5 μm was confirmed with an optical microscope. 2.2 parts of Neogen RK (Dai-ichi Kogyo Seiyaku Co., Ltd.) was additionally added and the temperature was raised to 80° C. and stirring for 2 hours was carried out to obtain spherical fused toner particles. After cooling to room temperature, filtration was performed and the filtered off solid was introduced into 720 parts of ion-exchanged water and dispersion and washing were performed for 1 hour. The solid was filtered off, and the dispersion/washing using ion-exchanged water was repeated until the electrical conductivity of the filtrate reached 150 μS/cm or less. Drying using a vacuum drier then yielded a toner particle (2).

A toner (8) was obtained by dry mixing 1.8 parts of a fine silica powder that had been hydrophobically treated and that had a specific surface area as measured by the BET method of 200 $m^2/g$, into 100 parts of the toner particle (2) using a Henschel mixer (Mitsui Mining Co., Ltd.).

Examples 9 to 13

Toners (9) to (13) were obtained proceeding as in Example 8, but changing the compound (1) in Example 8 to compound (13), (17), (35), (40), and (41), respectively.

Example 14

The following materials:

| | |
|---|---|
| binder resin (polyester resin) (composition: acid component = terephthalic acid, trimellitic acid, alcohol component = bisphenol A/propylene oxide adduct, glass-transition temperature: 55° C., acid value: 20 mg KOH/g, hydroxyl value: 16 mg KOH/g, molecular weights: Mp 4,500, Mn 2,300, Mw 38,000) | 100 parts |
| compound (1) | 6 parts |
| aluminum 1,4-di-t-butylsalicylate compound | 0.5 parts |
| paraffin wax (78° C. = peak temperature of the maximum endothermic peak measured by DSC) | 5 parts |
| were mixed using a Henschel mixer (Model FM-75J, Mitsui Mining Co., Ltd.) and were subsequently kneaded (temperature of the kneaded material at ejection = approximately 150° C.) at a feed rate of 60 kg/hr using a twin-screw kneader (Model PCM-45, Ikegai Ironworks Corporation) set to a temperature of 130° C. The resulting kneaded material was cooled and coarsely pulverized with a hammer mill and was then finely pulverized at a feed rate of 20 kg/hr using a mechanical pulverizer (T-250: Turbo Kogyo Co., Ltd.). | |

Toner particles were obtained by classifying the resulting finely pulverized material using a multi-grade classifier that employed the Coanda effect.

A toner (14) was obtained by dry mixing 1.8 parts of a fine silica powder that had been hydrophobically treated and that had a specific surface area as measured by the BET method of 200 $m^2/g$, into 100 parts of the obtained toner particles using a Henschel mixer (Mitsui Mining Co., Ltd.).

Examples 15 to 19

Toners (15) to (19) were obtained proceeding as in Example 14, but changing the compound (1) in Example 14 to compound (13), (17), (35), (40), and (41), respectively.

The particle size distribution of these toners was evaluated as described below. The results of the evaluations are given in Table 1 below.

<Evaluation of the Toner Particle Size Distribution>

The particle size distribution of the toners was evaluated using the index given by the ratio (D4/D1) between the weight-average particle diameter (D4) of the toner and its number-average particle diameter (D1), as obtained using a Coulter Counter.

A COULTER COUNTER TA-II or a Coulter Multisizer II (Beckman Coulter, Inc.) was used as the measurement instrumentation, and the measurements were performed using the operating manuals provided with these instruments. For the electrolyte, an approximately 1% aqueous sodium chloride solution was prepared using reagent-grade sodium chloride. ISOTON-II (Coulter Scientific Japan Co., Ltd.) was used for the electrolyte in the present invention. In the specific measurement method, 0.1 to 5 mL of a surfactant (preferably an alkylbenzenesulfonate) was added as the dispersing agent to 100 to 150 mL of this electrolyte and 2 to 20 mg of the measurement sample (toner) was further added. The electrolyte containing the suspended sample was subjected to a dispersion treatment for approximately 1 to 3 minutes using an ultrasound disperser. Using the resulting dispersion, the volume and count of the toner greater than or equal to 2.00 μm were measured with the measurement instrument equipped with a 100 μm aperture for the aperture, and the volume-based distribution and number-based distribution of the toner were calculated. These were used to determine the number-average particle diameter (D1), which was determined from the number-based distribution for the toner; the weight-average particle diameter (D4) (the median value of each channel was used as the representative value for each channel), which was determined from the volume-based distribution for the toner; and (D4/D1).

The following 13 channels were used for the channels: 2.00 to 2.52 μm, 2.52 to 3.17 μm, 3.17 to 4.00 μm, 4.00 to 5.04 μm, 5.04 to 6.35 μm, 6.35 to 8.00 μm, 8.00 to 10.08 μm, 10.08 to 12.70 μm, 12.70 to 16.00 μm, 16.00 to 20.20 μm, 20.20 to 25.40 μm, 25.40 to 32.00 μm, and 32.00 to 40.30 μm.

According to the following criteria, a determination of an excellent particle size distribution was made in the evaluation when (D4/D1) was less than or equal to 1.35.

A: (D4/D1) is less than or equal to 1.30

B: (D4/D1) is greater than or equal to 1.31, but less than or equal to 1.35

C: (D4/D1) is greater than or equal to 1.36

TABLE 1

| | toner No. | compound | D50 (μm) | D4/D1 | particle size distribution |
|---|---|---|---|---|---|
| Example 1 | toner (1) | compound (1) | 6.41 | 1.25 | A |
| Example 2 | toner (2) | compound (13) | 6.54 | 1.27 | A |
| Example 3 | toner (3) | compound (17) | 6.79 | 1.25 | A |
| Example 4 | toner (4) | compound (35) | 6.58 | 1.17 | A |
| Example 5 | toner (5) | compound (40) | 6.69 | 1.23 | A |
| Example 6 | toner (6) | compound (41) | 6.74 | 1.21 | A |
| Example 7 | toner (7) | compound (1) + P.B. 15:3 | 6.28 | 1.33 | B |
| Example 8 | toner (8) | compound (1) | 6.33 | 1.28 | A |
| Example 9 | toner (9) | compound (13) | 6.46 | 1.23 | A |
| Example 10 | toner (10) | compound (17) | 6.69 | 1.29 | A |
| Example 11 | toner (11) | compound (35) | 6.31 | 1.22 | A |
| Example 12 | toner (12) | compound (40) | 6.51 | 1.28 | A |
| Example 13 | toner (13) | compound (41) | 6.25 | 1.25 | A |

TABLE 1-continued

| | toner No. | compound | D50 (μm) | D4/D1 | particle size distribution |
|---|---|---|---|---|---|
| Example 14 | toner (14) | compound (1) | 6.51 | 1.27 | A |
| Example 15 | toner (15) | compound (13) | 6.78 | 1.21 | A |
| Example 16 | toner (16) | compound (17) | 6.42 | 1.25 | A |
| Example 17 | toner (17) | compound (35) | 6.64 | 1.19 | A |
| Example 18 | toner (18) | compound (40) | 6.37 | 1.25 | A |
| Example 19 | toner (19) | compound (41) | 6.64 | 1.23 | A |
| Comparative Example 1 | toner (comparative 1) | comparative compound (1) | 6.87 | 1.39 | C |
| Comparative Example 2 | toner (comparative 2) | comparative compound (2) | 9.98 | 1.42 | C |

D50 in Table 1 denotes the median diameter obtained with the Coulter Counter.

<Evaluation of Toner Chromogenicity>

The chromogenicity was evaluated by comparing the relative absorption intensities of evaluation samples obtained by melting and press-bonding the toner on a glass substrate. The relative absorption intensity referenced in the present invention denotes the ratio (Q/B) between the Q band intensity observed at 600 to 700 nm and the Soret band intensity observed at 200 to 300 nm, which are characteristic of phthalocyanine compounds. For phthalocyanine compounds, this originates with the fact that the Q band intensity, which reacts sensitively to changes in the external environment, exercises a strong influence on the chromogenicity. The preparation of the specific evaluation sample and the evaluation were carried out using the following methods.

[Preparation of the Toner Chromogenicity Evaluation Sample]

0.5 g of the toner was uniformly spread over a 2 $cm^2$ glass substrate and hot-pressing was performed at 1 kg/160° C. using a BIG HEATER (Imoto Machinery Co., Ltd.) to provide the chromogenicity evaluation sample.

[Evaluation of Toner Chromogenicity]

The UV spectrum was measured (UV-3600, UV-VIS-NIR SPECTROPHOTOMETER, Shimadzu Corporation) on the obtained chromogenicity evaluation sample and the chromogenicity was evaluated. The results of the chromogenicity evaluation are shown in Table 2.

According to the following criteria, a determination of an excellent chromogenicity was made in the evaluation when the Q band intensity/Soret band intensity was greater than or equal to 1.30.

A: Q band intensity/Soret band intensity greater than or equal to 1.80

B: Q band intensity/Soret band intensity greater than or equal to 1.30, but less than 1.80

C: Q band intensity/Soret band intensity less than 1.30

TABLE 2

| | toner No. | compound | Q band intensity/Soret band intensity | chromogenicity |
|---|---|---|---|---|
| Example 1 | toner (1) | compound (1) | 1.53 | B |
| Example 2 | toner (2) | compound (13) | 2.17 | A |
| Example 3 | toner (3) | compound (17) | 1.69 | B |
| Example 4 | toner (4) | compound (35) | 6.78 | A |
| Example 5 | toner (5) | compound (40) | 5.51 | A |
| Example 6 | toner (6) | compound (41) | 6.49 | A |
| Example 7 | toner (7) | compound (1) + P.B. 15:3 | 1.47 | B |
| Example 8 | toner (8) | compound (1) | 1.51 | B |
| Example 9 | toner (9) | compound (13) | 2.09 | A |
| Example 10 | toner (10) | compound (17) | 1.64 | B |
| Example 11 | toner (11) | compound (35) | 6.53 | A |
| Example 12 | toner (12) | compound (40) | 5.37 | A |
| Example 13 | toner (13) | compound (41) | 6.29 | A |
| Example 14 | toner (14) | compound (1) | 1.51 | B |
| Example 15 | toner (15) | compound (13) | 2.20 | A |
| Example 16 | toner (16) | compound (17) | 1.62 | B |
| Example 17 | toner (17) | compound (35) | 6.67 | A |
| Example 18 | toner (18) | compound (40) | 5.44 | A |
| Example 19 | toner (19) | compound (41) | 6.36 | A |
| Comparative Example 1 | toner (comparative 1) | comparative compound (1) | 1.22 | C |
| Comparative Example 2 | toner (comparative 2) | comparative compound (2) | 1.27 | C |

As shown in Tables 1 and 2, the toner of the present invention exhibits an excellent chromogenicity.

In addition, a toner that has an excellent particle size distribution and an excellent chromogenicity is provided by the toner production method of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183477, filed Aug. 22, 2012, which is hereby incorporated by reference herein in its entirety.

The invention claimed is:

1. A toner comprising a binder resin and a colorant, wherein the colorant comprises a coloring compound that has the structure shown by the following general formula (1)

general formula (1)

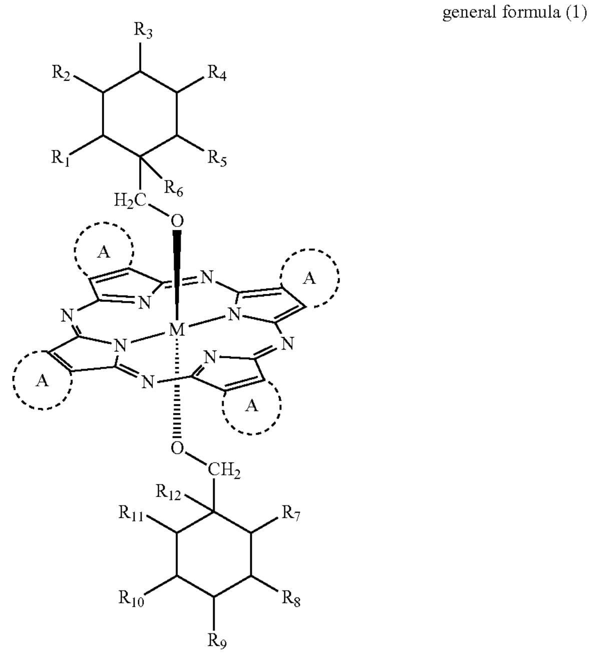

in general formula (1), $R_1$ to $R_6$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_1$ to $R_6$ to each other;

$R_7$ to $R_{12}$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_7$ to $R_{12}$ to each other;

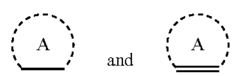

each independently represent either one of a substituted or unsubstituted aryl ring and a heterocycle that contains 1 or 2 nitrogen atoms; and M represents at least one metal atom selected from the group consisting of Si, Ge, and Sn.

2. The toner according to claim 1, wherein the coloring compound having the structure shown by general formula (1) satisfies the following condition i) or ii):

(i) $R_1$ to $R_6$ are atomic groups as required to form a saturated cyclic hydrocarbon ring by the bonding of any two or more of $R_1$ to $R_6$ to each other;

(ii) $R_7$ to $R_{12}$ are atomic groups as required to form a saturated cyclic hydrocarbon ring by the bonding of any two or more of $R_7$ to $R_{12}$ to each other.

3. The toner according to claim 1, wherein the saturated cyclic hydrocarbon ring having $R_1$ to $R_6$ or the saturated cyclic hydrocarbon ring having $R_7$ to $R_{12}$ is an adamantane ring.

4. The toner according to claim 1, wherein the

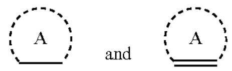

in general formula (1) are each independently a substituted or unsubstituted benzene ring, pyridine ring, or pyrazine ring.

5. The toner according to claim 1, wherein the

A and A in general formula (1) are each independently a substituted or unsubstituted benzene ring.

6. The toner according to claim 1, wherein the

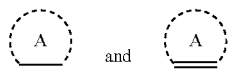

in general formula (1) are each independently a benzene ring having a tert-butyl group.

7. The toner according to claim 1, wherein M in general formula (1) is Si.

8. The toner according to claim 1, further comprising a wax.

9. A method of producing a toner, comprising the step of dispersing in an aqueous medium a polymerizable monomer composition containing a polymerizable monomer and a colorant to produce particles of the polymerizable monomer composition and thereafter polymerizing the polymerizable monomer to produce toner particles, wherein the colorant contains a coloring compound that has the structure shown by the following general formula (1)

general formula (1)

[C2]

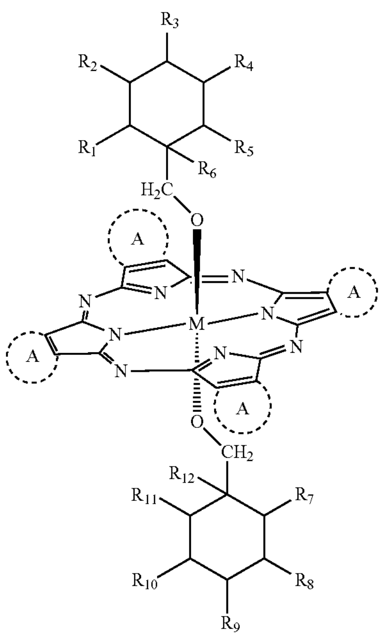

in general formula (1), $R_1$ to $R_6$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_1$ to $R_6$ to each other;

$R_7$ to $R_{12}$ each independently represent a hydrogen atom, an alkyl group, a hydroxyl group, an amino group, a carboxy group, an aryl group, an aralkyl group, —$CH_2OH$, or —$CH_2$—O—CH═$CH_2$, or an atomic group as required to form a saturated alicyclic hydrocarbon ring by the bonding of any two or more of $R_7$ to $R_{12}$ to each other;

A and A each independently represent either one of a substituted or unsubstituted aryl ring and a heterocycle that contains 1 or 2 nitrogen atoms; and M represents at least one metal atom selected from the group consisting of Si, Ge, and Sn.

10. The toner production method according to claim 9, wherein the coloring compound having the structure shown by general formula (1) satisfies the following condition i) or ii):

(i) $R_1$ to $R_6$ are atomic groups as required to form a saturated cyclic hydrocarbon ring by the bonding of any two or more of $R_1$ to $R_6$ to each other;

(ii) $R_7$ to $R_{12}$ are atomic groups as required to form a saturated cyclic hydrocarbon ring by the bonding of any two or more of $R_7$ to $R_{12}$ to each other.

11. The toner production method according to claim 9, wherein the saturated cyclic hydrocarbon ring having $R_1$ to $R_6$ or the saturated cyclic hydrocarbon ring having $R_7$ to $R_{12}$ is an adamantane ring.

12. The toner production method according to claim 9, wherein the

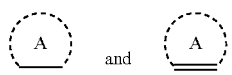

in general formula (1) are each independently a substituted or unsubstituted benzene ring, pyridine ring, or pyrazine ring.

13. The toner production method according to claim 9, wherein the

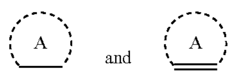

in general formula (1) are each independently a substituted or unsubstituted benzene ring.

14. The toner production method according to claim 9, wherein the

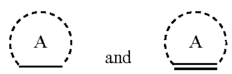

in general formula (1) are each independently a benzene ring having a tert-butyl group.

15. The toner production method according to claim 9, wherein M in general formula (1) is Si.

16. The toner production method according to claim 9, wherein the polymerizable monomer composition further contains a wax.

* * * * *